United States Patent
Sambonet

(10) Patent No.: US 9,468,289 B2
(45) Date of Patent: Oct. 18, 2016

(54) MULTIUSE TABLE HAVING A VARIABLE CONFIGURATION

(71) Applicant: LA TAVOLA S.r.l., Vercelli (IT)

(72) Inventor: Sergio Sambonet, Milan (IT)

(73) Assignee: LA TAVOLA S.R.L., Vercelli (VC) (IT)

( * ) Notice: Subject to any disclaimer, the term of this patent is extended or adjusted under 35 U.S.C. 154(b) by 295 days.

(21) Appl. No.: 14/064,357

(22) Filed: Oct. 28, 2013

(65) Prior Publication Data

US 2014/0117004 A1    May 1, 2014

(30) Foreign Application Priority Data

Oct. 31, 2012   (IT) .......................... MI2012A001867

(51) Int. Cl.
| | |
|---|---|
| *A47B 13/08* | (2006.01) |
| *A47B 13/16* | (2006.01) |
| *A47B 31/02* | (2006.01) |
| *A47J 39/00* | (2006.01) |
| *A47J 39/02* | (2006.01) |

(52) U.S. Cl.
CPC ............. *A47B 13/088* (2013.01); *A47B 13/16* (2013.01); *A47B 2200/0009* (2013.01); *A47J 39/006* (2013.01)

(58) Field of Classification Search
None
See application file for complete search history.

(56) References Cited

U.S. PATENT DOCUMENTS

| | | | |
|---|---|---|---|
| 2,548,932 A | | 4/1951 | Ball |
| 3,241,885 A | * | 3/1966 | Deaton ................ A47B 47/047 108/186 |
| 3,688,707 A | * | 9/1972 | White .................... A47B 13/08 108/13 |
| 4,038,126 A | * | 7/1977 | Lester ..................... A47B 3/06 156/290 |
| 4,225,626 A | | 9/1980 | Chiu et al. |
| 4,910,372 A | * | 3/1990 | Vukich ................ H05B 6/1209 219/218 |
| 5,183,027 A | * | 2/1993 | Saldana .............. A47J 37/0704 108/50.13 |
| 6,659,023 B2 | * | 12/2003 | Saltzman ............... A47B 13/08 108/161 |
| 8,020,546 B1 | | 9/2011 | Bourgeois et al. |
| 8,763,823 B2 | * | 7/2014 | Eaves, Jr. .............. A47B 77/16 108/25 |
| 8,822,885 B2 | * | 9/2014 | Daneshvar ............... A47B 9/14 108/115 |
| 9,198,539 B1 | * | 12/2015 | Bourgeois .............. A47B 37/04 |
| 2006/0288997 A1 | * | 12/2006 | Griffin ..................... A47J 36/26 126/33 |
| 2008/0179087 A1 | * | 7/2008 | De Ambroggi .......... H02G 3/14 174/559 |
| 2013/0292388 A1 | * | 11/2013 | Ottenwalder .......... A47G 23/04 220/574.2 |

FOREIGN PATENT DOCUMENTS

| | | |
|---|---|---|
| DE | 200 02 494 U1 | 2/2001 |
| DE | 20 2012 103 643 U1 | 10/2012 |

OTHER PUBLICATIONS

Search Report of Italian MI20121867 dated Jul. 12, 2013.

* cited by examiner

*Primary Examiner* — Joseph M Pelham
(74) *Attorney, Agent, or Firm* — Lucas & Mercanti, LLP

(57) ABSTRACT

The invention concerns a worktop suitable for being associated with hollows obtained both in tables and in fixed structures, said worktop having a variable configuration for supporting and inserting removable accessories and a plurality of the elements in mutual lateral contact in a plurality of openings; said worktop comprising a perimetrical frame shaped complementarily to the hollows of the table or fixed structure, the perimetrical frame having portions protruding towards the inside of the table which are provided with means for variably positioning rods into the perimetrical frame, which define the openings.

9 Claims, 41 Drawing Sheets

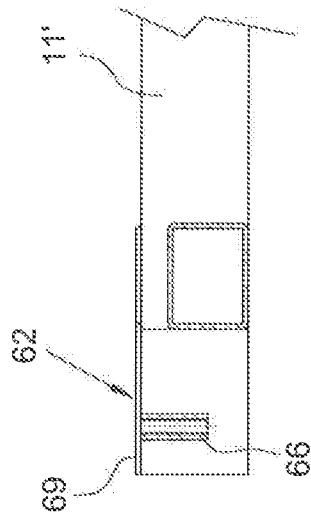
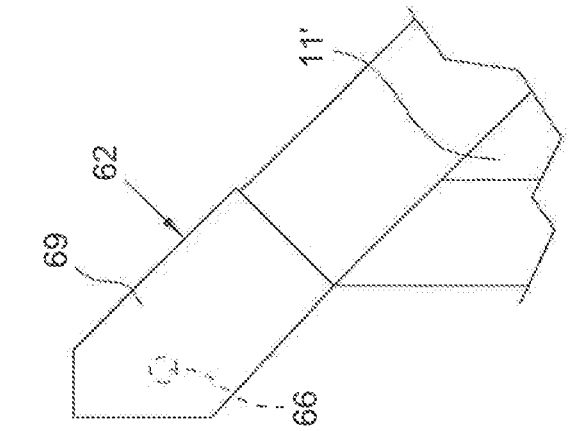
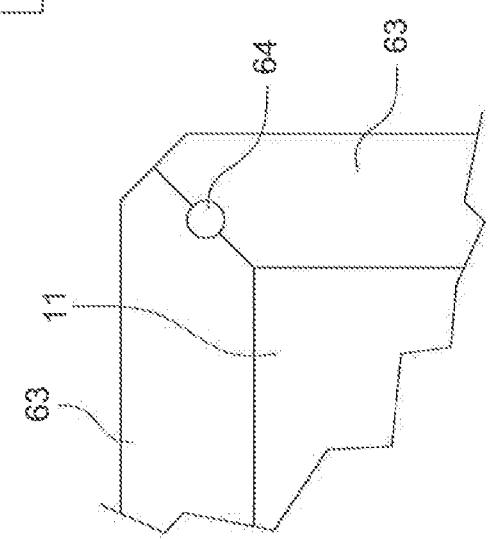
Fig. 25
Fig. 26

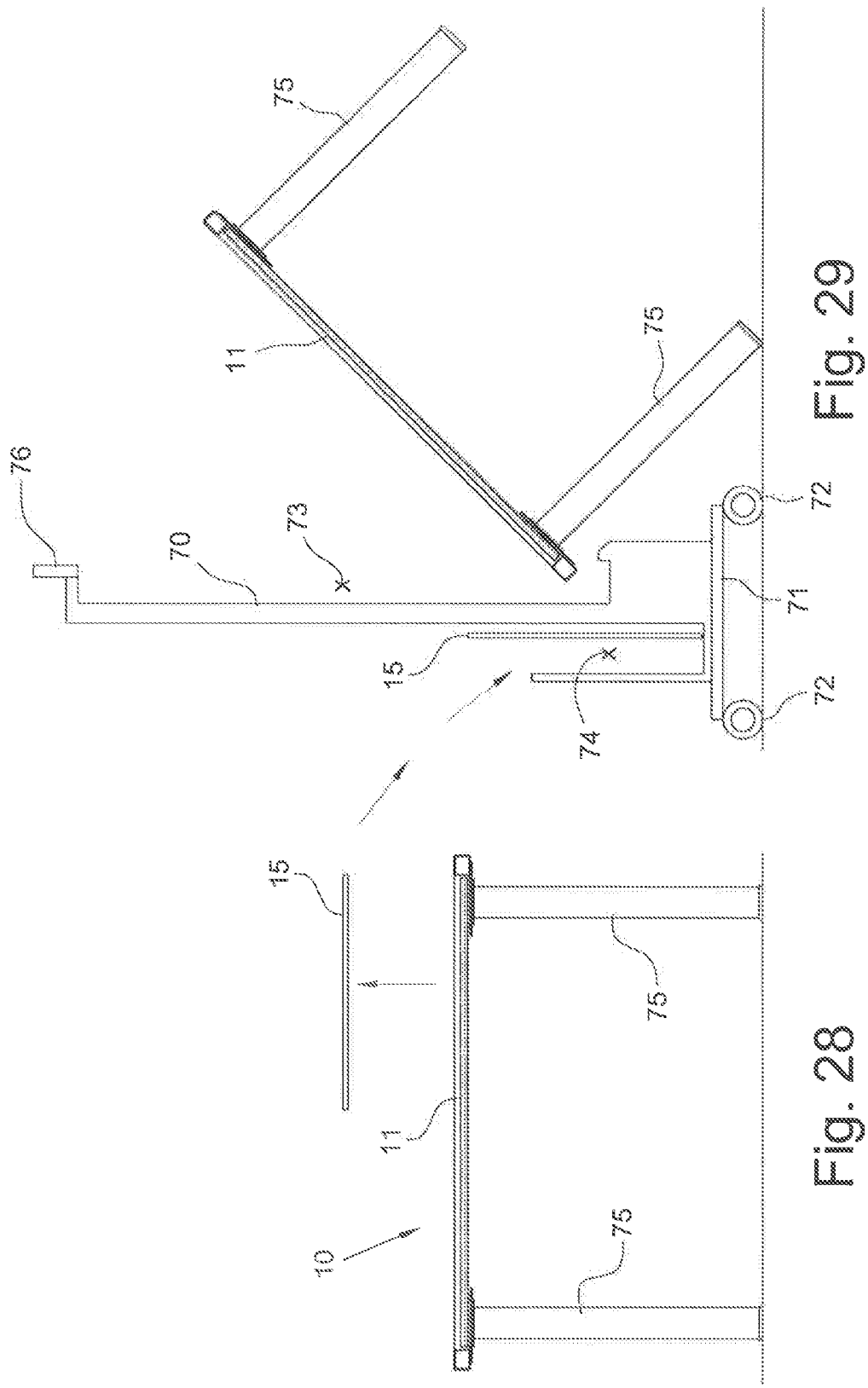

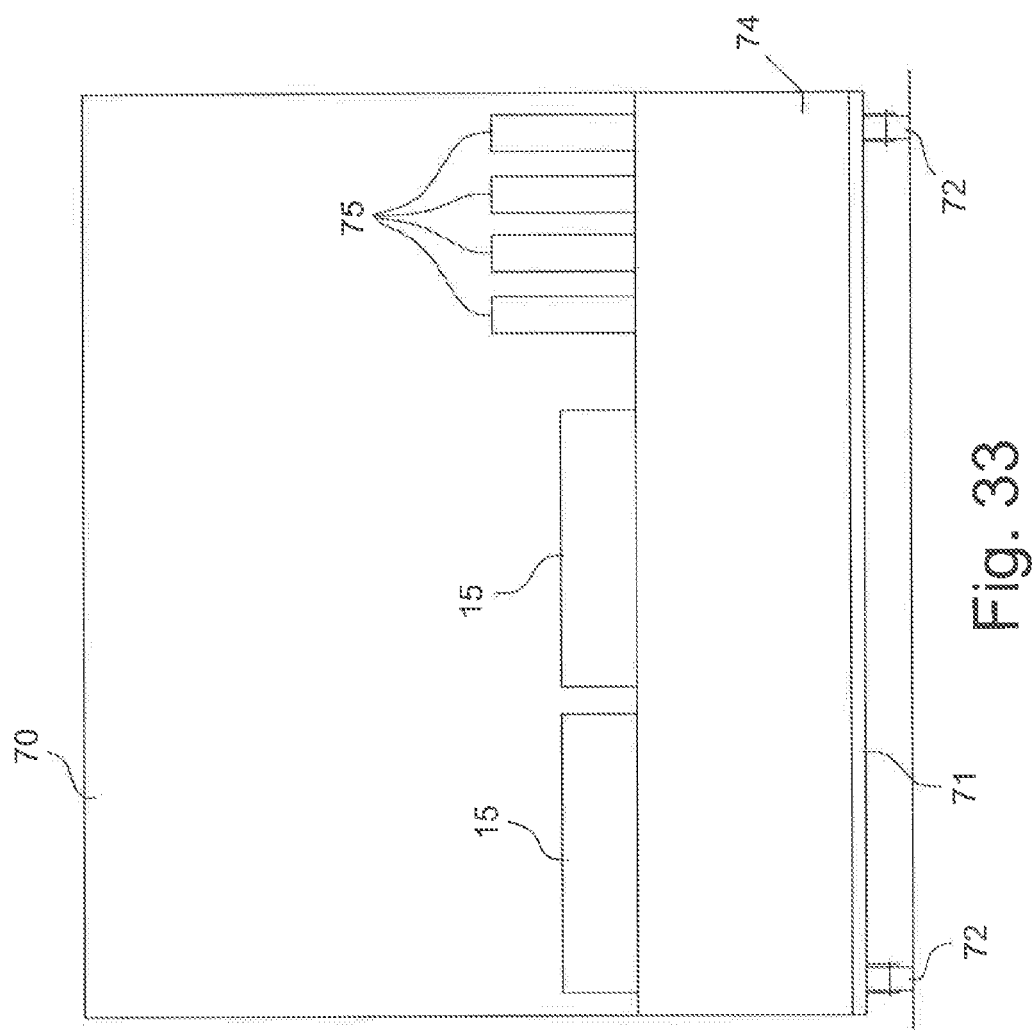
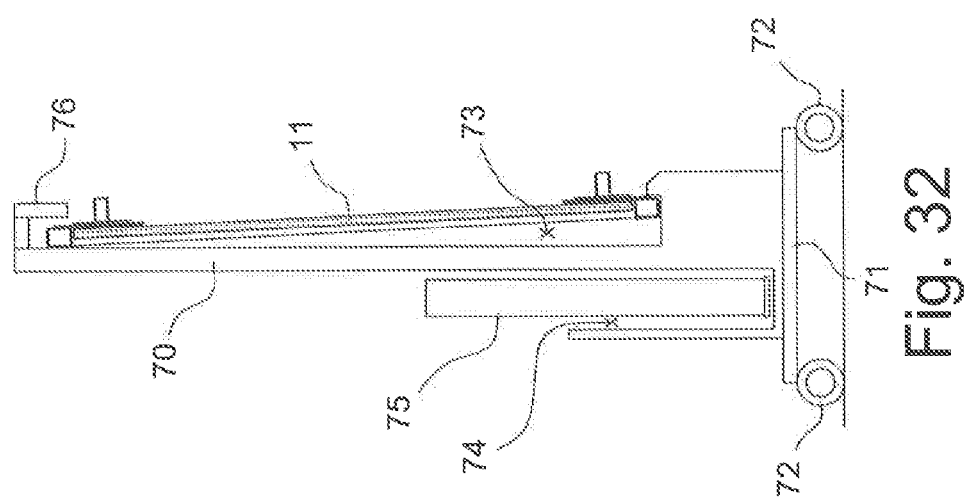

MULTIUSE TABLE HAVING A VARIABLE CONFIGURATION

CROSS-REFERENCE TO RELATED APPLICATIONS

This application claims the benefit of Italian Patent Application No. MI2012A 001867, filed Oct. 31, 2012, the contents of which are incorporated herein by reference.

FIELD OF THE INVENTION

The present invention refers to a multiuse table, in particular for removably supporting removable accessories and the elements in mutual lateral contact.

In particular, the purpose of the present invention is that of conceiving a table that with simple operations can be used for many different uses by receiving accessories with different dimensions.

Therefore the table according to the present invention can be used tooth as a common table and as the "dynamic" support for removable accessories.

Such removable accessories can be of many different kinds, such as worktops, kitchen devices, elements for displaying food and beverages, induction or electric heating plates, electric or Peltier cooler places, bain marie pots or chafing dishes, or other similar accessories.

The rest of the description shall refer in particular to chafing dishes as a preferred example of all those removable accessories that can be supported by the multiuse table according to the present invention.

BACKGROUND OF THE INVENTION

Today, two types of tables are known, both having a fixed upper plane, for supporting chafing dishes.

According to a first known type, suitable in particular for fixed built-in chafing dishes, on the worktop of the table openings are formed, in which the chafing dishes are fixed in an immovable manner.

Such tables on one hand have a pleasing appearance, in which indeed the chafing dishes are integrated well with the rest of the structure, but on the other hand they have the double drawback of not being able to be used for other purposes and of not allowing the user to modify the outer appearance as desired. In this case difficult cleaning operations are required.

A second type of tables, suitable in particular for removable chafing dishes, have a worktop or which resting areas can be forced directly on the plane or in suitable complementary housing.

These tables on one hang have the advantage of being able to be used also for other purposes, but on the other hand they have numerous drawbacks. Only as art example, in these tables the chafing dishes are not integrated with the rest of the structure in a pleasing manner, indeed like for example the case in which the induction or electric prates have apparatuses and electric cables that are not hidden but in view, therefore anti-aesthetic and bulky.

Finally, in general, as the dimensions of the accessory vary, it is unfortunately necessary nowadays to have a whole series of tables with matching housings.

SUMMARY OF THE INVENTION

The purpose of the present invention is that of making a multiuse table, in particular for removably supporting accessories, and a the element that can be associated in a removable manner to such a table, capable of making a decorative ceramic plane and a worktop in steel, that can be replaced and interchanged, suitable in particular for supporting and inserting removable accessories that are capable of solving the drawbacks mentioned above of the prior art in an extremely simple, cost-effective and particularly functional manner.

Another purpose is that of making a multiuse table, in particular for removably supporting accessories, and a the element that can be associated in a removable manner to such a table, in which the accessories are removable but integrated well with the rest of the structure.

A further purpose is that of making a multiuse table, in particular for supporting removable accessories, and a the element that can be associated in a removable manner to such a table, in which the table can be used, for many purposes for housing various accessories of different nature, is easy to clean and makes it possible for the user to modify its appearance as desired.

A further purpose is that of making a multiuse table, in particular for supporting removable accessories, in which are foldaway integrated electric connection cables.

A further purpose is that of making a multiuse table, in particular for removably supporting accessories, which is extensible and can be configured as desired combining together many tables so as to adapt to the different space and furnishing requirements without affecting the appearance of the table negatively.

A further purpose is that of making a multiuse table, in particular for supporting removable accessories, which is easily disassembled, transported and stored with small bulk.

These purposes according to the present invention are achieved by making a multiuse table, in particular for supporting removable accessories, and a the element that can be associated to such a table in a removable manner, as outlined in the claims.

Further characteristics of the invention are highlighted in the dependent claims.

BRIEF DESCRIPTION OF THE DRAWINGS

The characteristics and the advantages of & multiuse table, in particular for supporting removable accessories, and of a the element according to the present invention that can be associated to such a table in a removable manner, shall become clearer from the following description, given as an example and not for limiting purposes, with reference to the attached schematic drawings, in which:

FIGS. 23-27 and 34-39 stow angular protection and connection elements of the table according to the present invention;

FIGS. 28-33 show the accessories and the actions to be carried out for disassembling, transporting and storing the table, according to the present invention, with a small bulk;

DETAILED DESCRIPTION OF THE INVENTION

With reference to the figures, embodiments of multiuse tables are shown, in particular for supporting removable accessories, and or the elements according to the present invention that can be associated to such tables in a removable manner.

The rest of the description shall refer to a chafing dish as a preferred example of all the removable accessories.

However, it is worth underlining again that such a term does not exclusively refer to a chafing dish in the strict sense, but also to a series of similar accessories, such as worktops, kitchen appliances, elements for displaying food or beverages or more.

Figure 1:
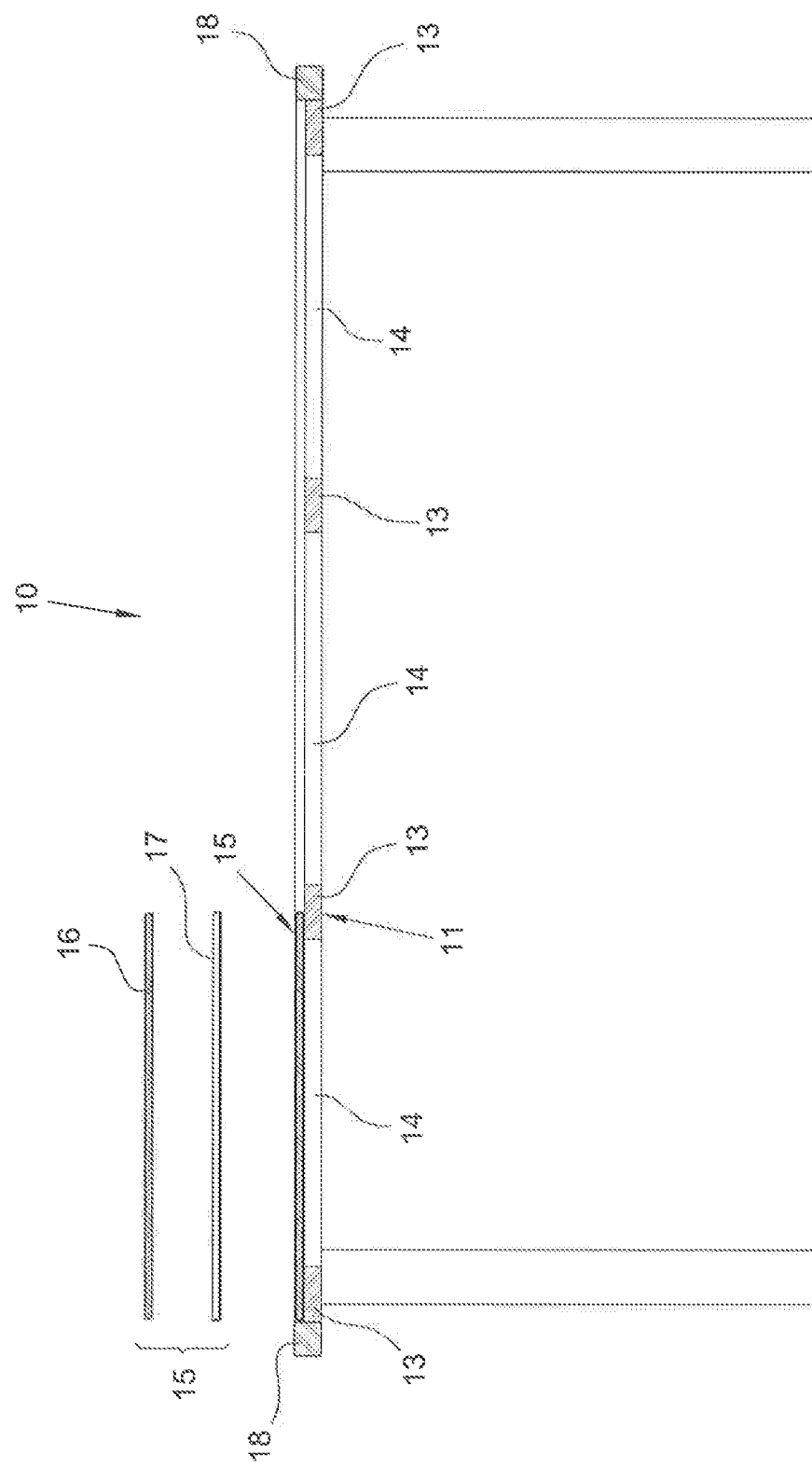
FIG. 1 is a partially exploded schematic elevation view of a first embodiment of a multiuse table, in particular for supporting removable accessories according to the present invention.

As visible in FIG. 1, such a multiuse table 10 is of the type provided with a worktop 11 provided with a plurality of openings 14 for supporting removable accessories 12 of the chafing dish type, and with a plurality of removable the elements 15 that are supported on the lower frame 13 in mutual lateral contact.

The worktop 11 is indeed independent with respect to the table and it can indeed be advantageously used not only on the dedicated tables which shall be described in the rest of the description, but also in hollows formed in fixed structures, or in mobile structures, like for example trolleys, carts e mobile stations.

In particular the term "worktop" means planes that are intended to be used as surfaces for displaying buffet meals or the like.

According to the invention the worktop 11 comprises a perimetrical frame 13' that, when coupled with the relative table, is supported inside a frame 13 that is provided with legs 45.

Such a frame 18 indeed has some portions, both angular 80 and central 81 for supporting the perimetrical frame 13' which in turn comprises lateral portions 82 protruding towards the inside or the table.

These protruding portions 82 are provided with means for variably positioning rods 1 into the table.

In turn also such rods 13" can be provided with protrusions 83 for variably positioning other rods 13'".

In the example represented in the figures the means for variably positioning rods 13" into the table are a plurality of holes 84 chat are obtained on the portions 82 and 83.

By varying the position of the rods 13" in the holes 84 obtained on the frame 13' or on the rods 13" themselves as desired, it is possible to modify the openings/housings 14 of the table for receiving the removable accessories.

In such a way with a single table and some rods 13" it is possible to obtain a plurality of useful configurations for different requirements.

Only as an example, FIGS. 46-55 show some different configurations of housings for receiving removable tiles 15 and accessories 12 such as chafing dishes, displaying trays, cooking plates, and more.

Each of such the elements 15, sold also separately from the table and therefore also independently protected by the present invention, comprises a the of ceramic material 16, for example porcelain stoneware, that is covered, on one side, with a layer of steel coating 1 which also covers the edges.

In order to prevent the tiles from accidentally breaking during their movement, this coating 17 at least partially covers also the lateral edges of the tiles of ceramic material 15.

Figure 9:
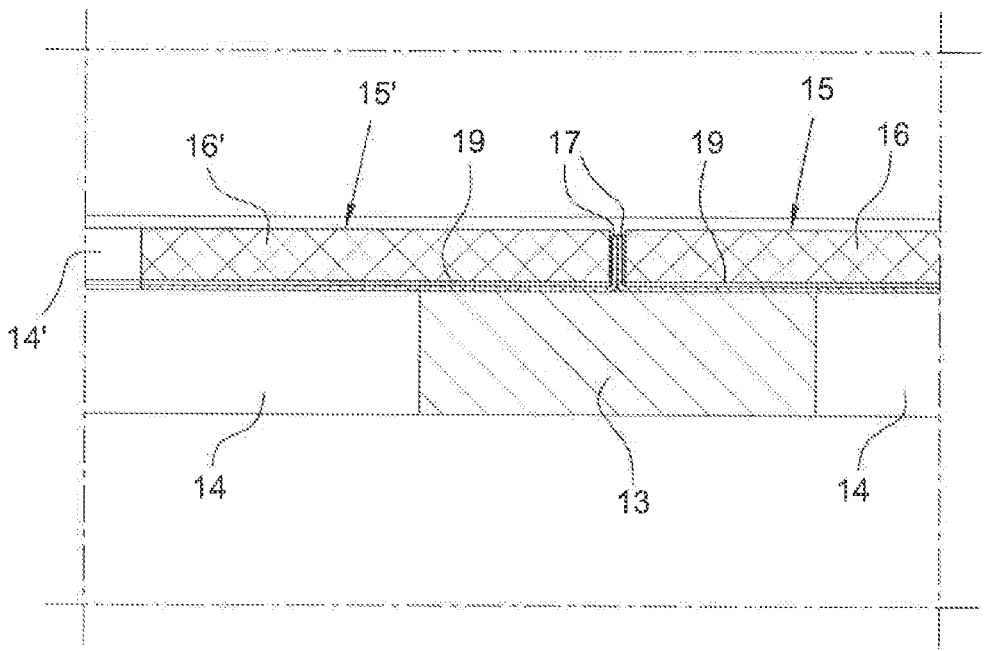

The tile of ceramic material 16 and the relative coating 17 can be joined for example through the interposition of glue 19, visible for example in FIG. 9.

The lower frame 13 is preferably made from aluminum whereas both the receiving housings 14 and the tile elements 15 are rectangular or square-shaped.

Figure 8:
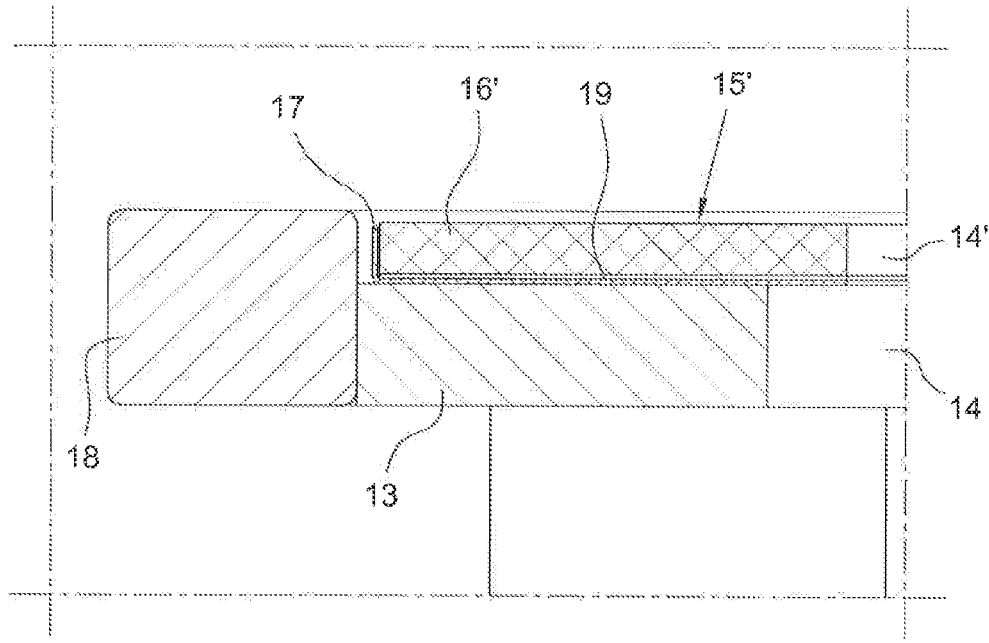
FIGS. 8 and 9 are enlarged views of the details indicated with A and B in FIG. 6.

Finally, as shown in FIG. 8, the multiuse table 10 can comprise a raised perimetrical edge 18, also mace from steel, which acts as an element for containing the the elements.

Preferably, such a perimetrical edge 18 projects from the lower frame 13 for a height that is equal to that of the tile elements 15.

Figure 6:
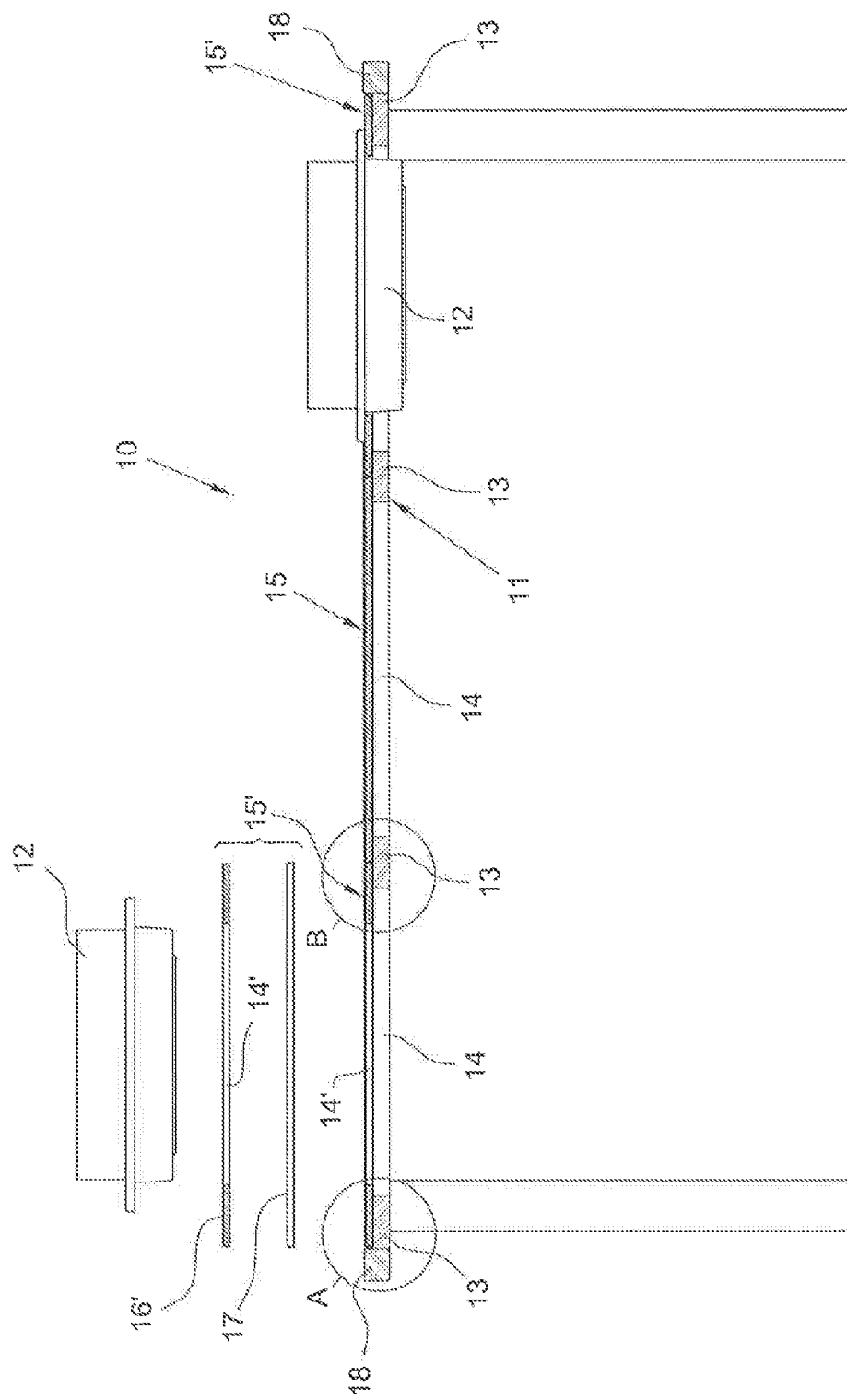
FIG. 6 is a partially exploded schematic elevation view of a second embodiment of a multiuse table, in particular for supporting removable accessories according to the present invention.

According to another embodiment, shown for example in FIG. 6, also the tile elements 15' can in turn comprise an opening 14' for receiving the chafing dishes 12 by support.

FIGS. 10-15 show two different possible uses of the table 10 by means of the perforated the elements 15'. Indeed, in the case in which the accessory to be used is a chafing dish 12, the table 10 makes it possible to use both an induction plane 20 and an electric plate 21 as a heating source for the chafing dishes 12.

Figure 10:
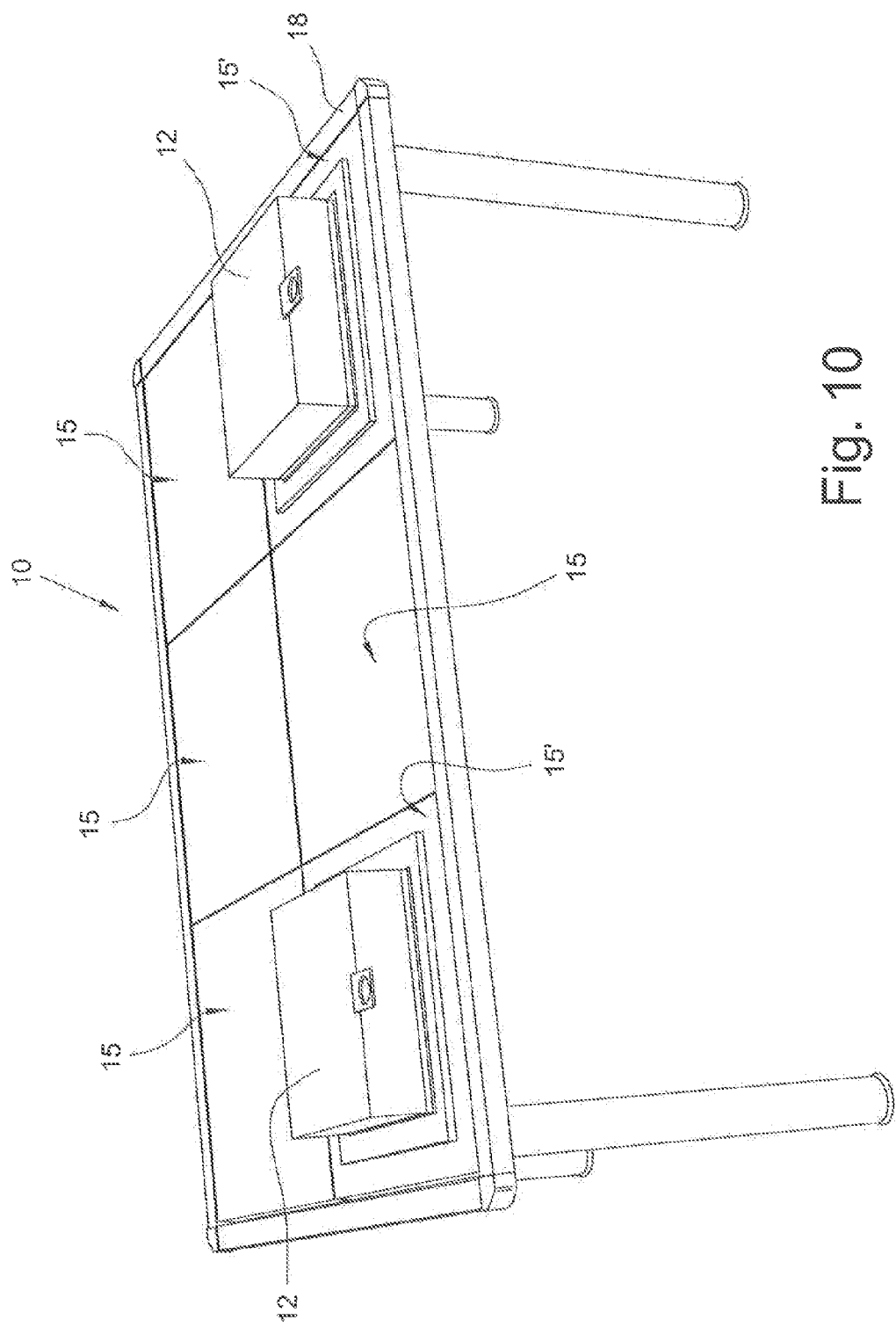
FIGS. 10, 11 and 14 are a perspective view and an exploded view, respectively, of a possible use of the table of FIG. 6.
Figure 11:
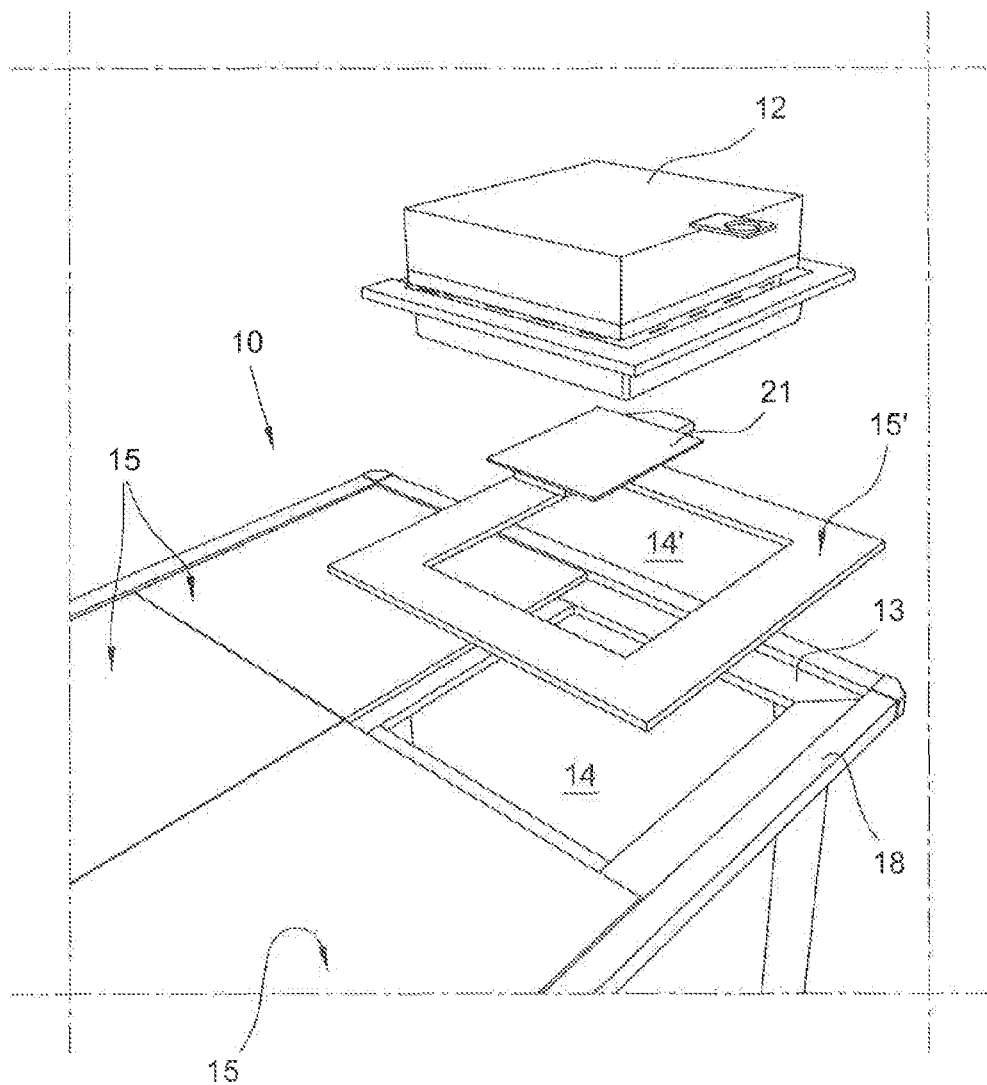
Figure 12:
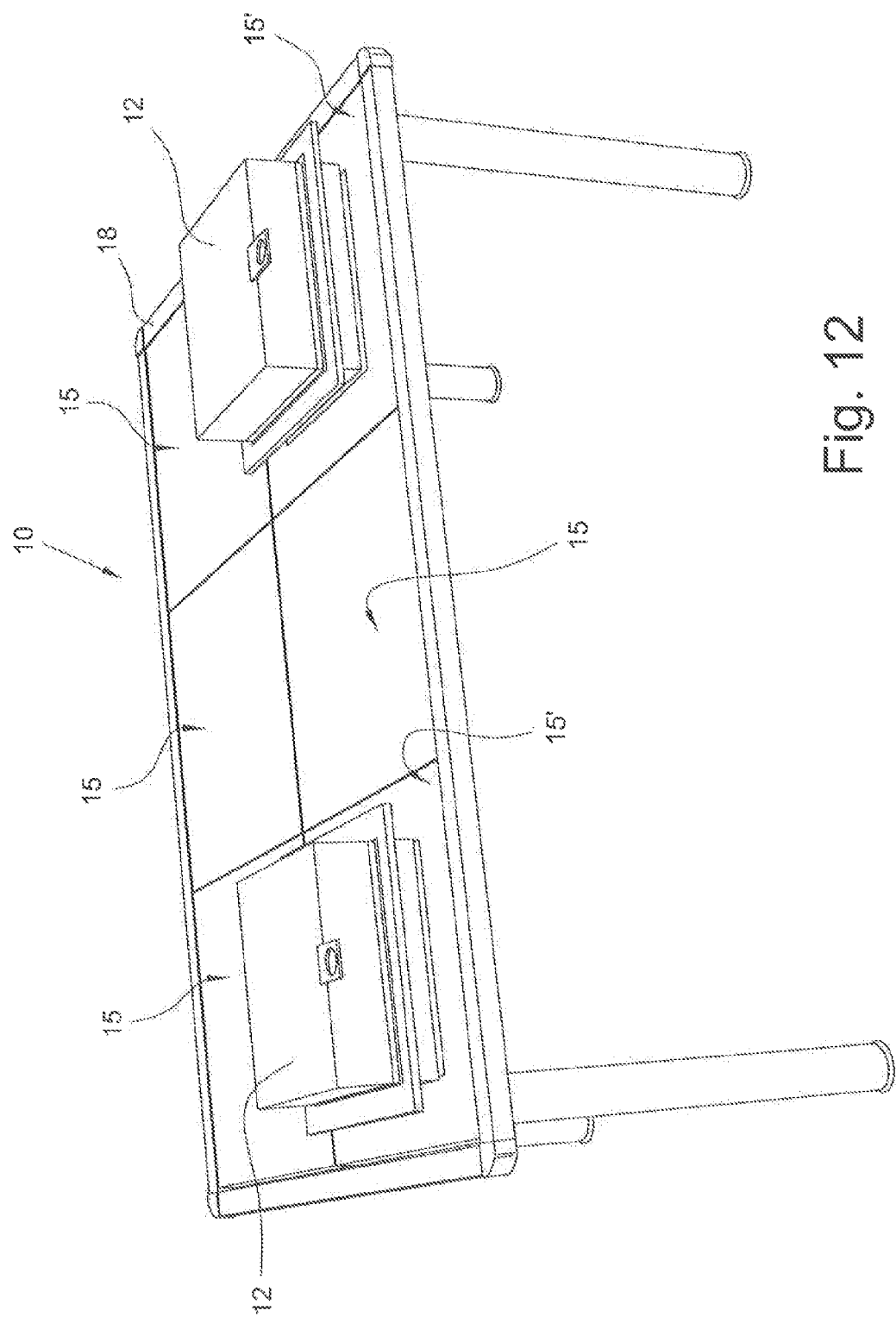
FIGS. 12, 13 and 15 are a perspective view and an exploded view, respectively, of another possible use of the table of FIG. 6.
Figure 13:
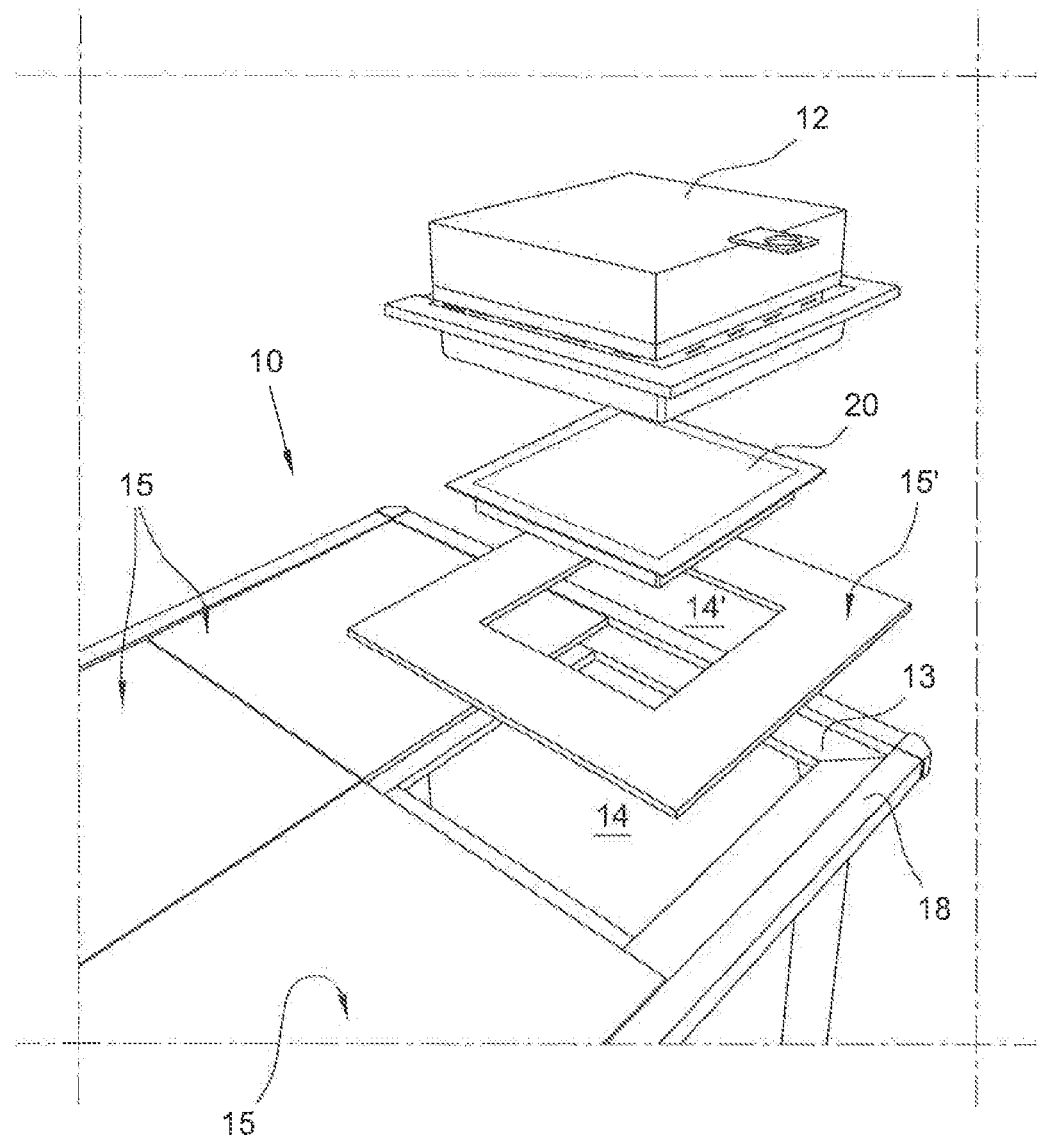
Figure 14:
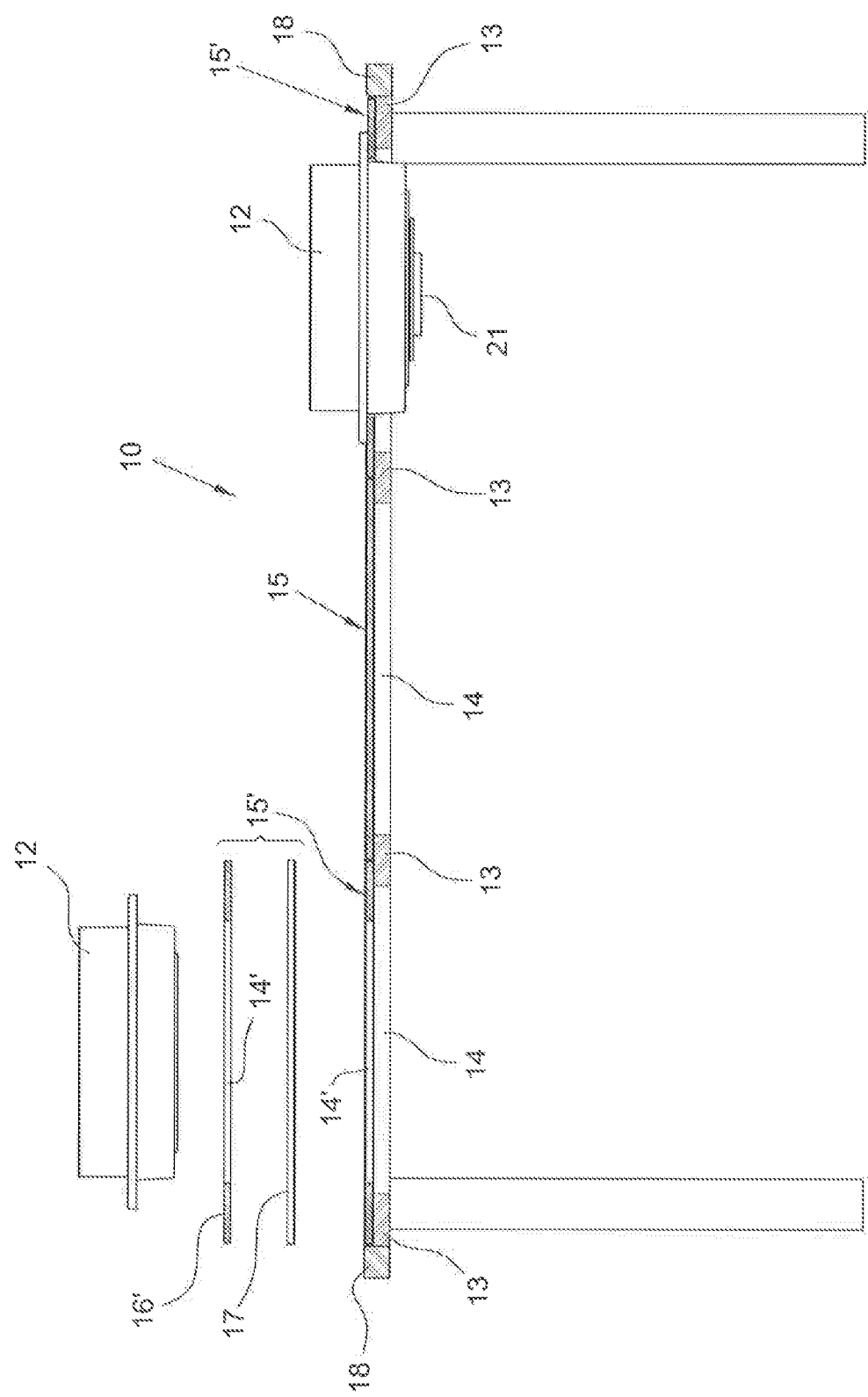

As visible in FIGS. 10 and 11, the electric plate 21 is perfectly integrated at the bottom of the chafing dishes 12 so as to not prevent it from being built-in in the perforated the 15' whereas, as visible in FIGS. 12 and 13, in the case of an induction plane 20, the latter is inserted in the opening 14' of the the 15' forming the new plane for supporting the chafing dish 12.

Figure 16:
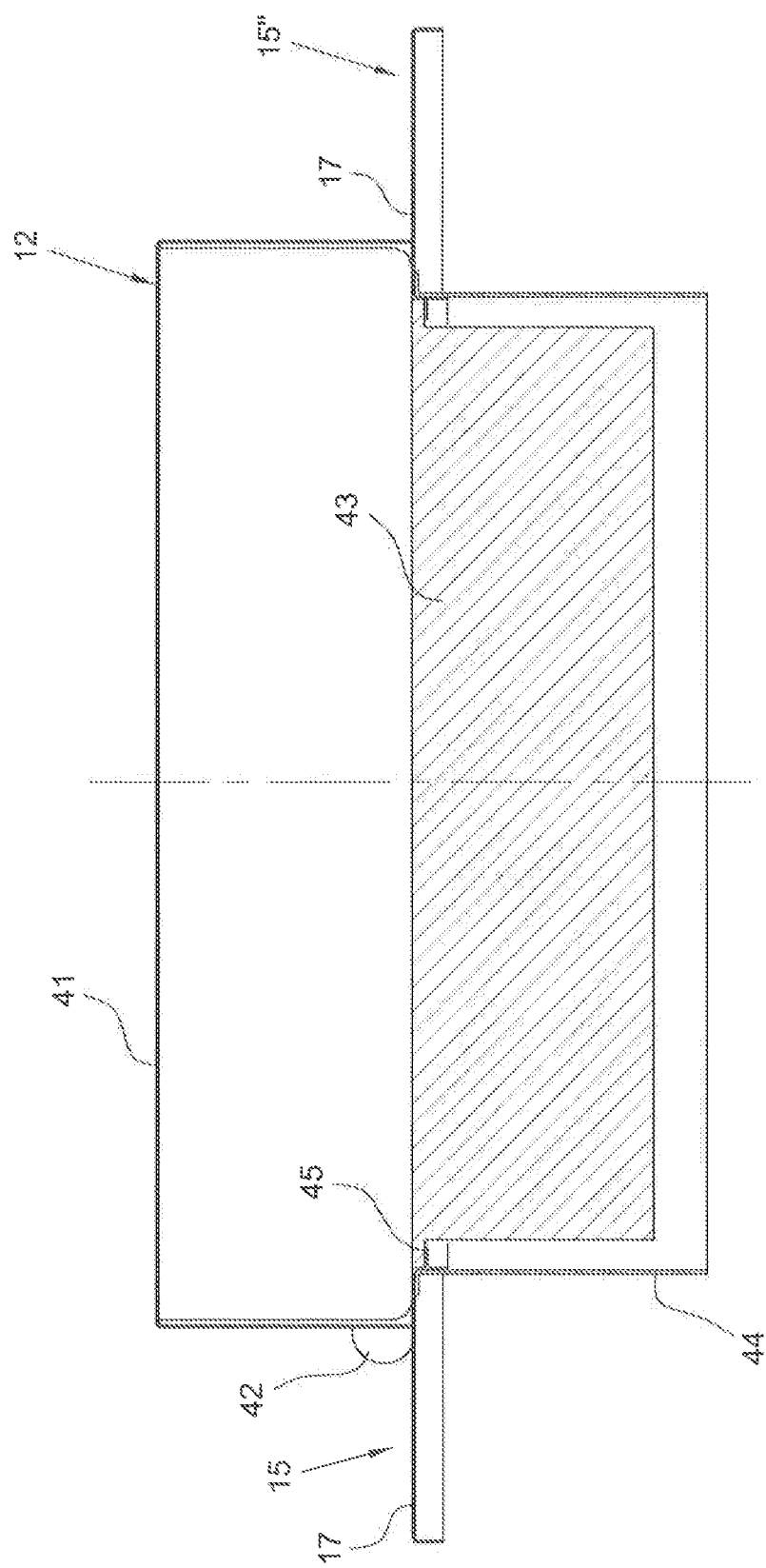
FIG. 16 is a schematic view of a further embodiment of a the element according to the present invention.
Figure 17:
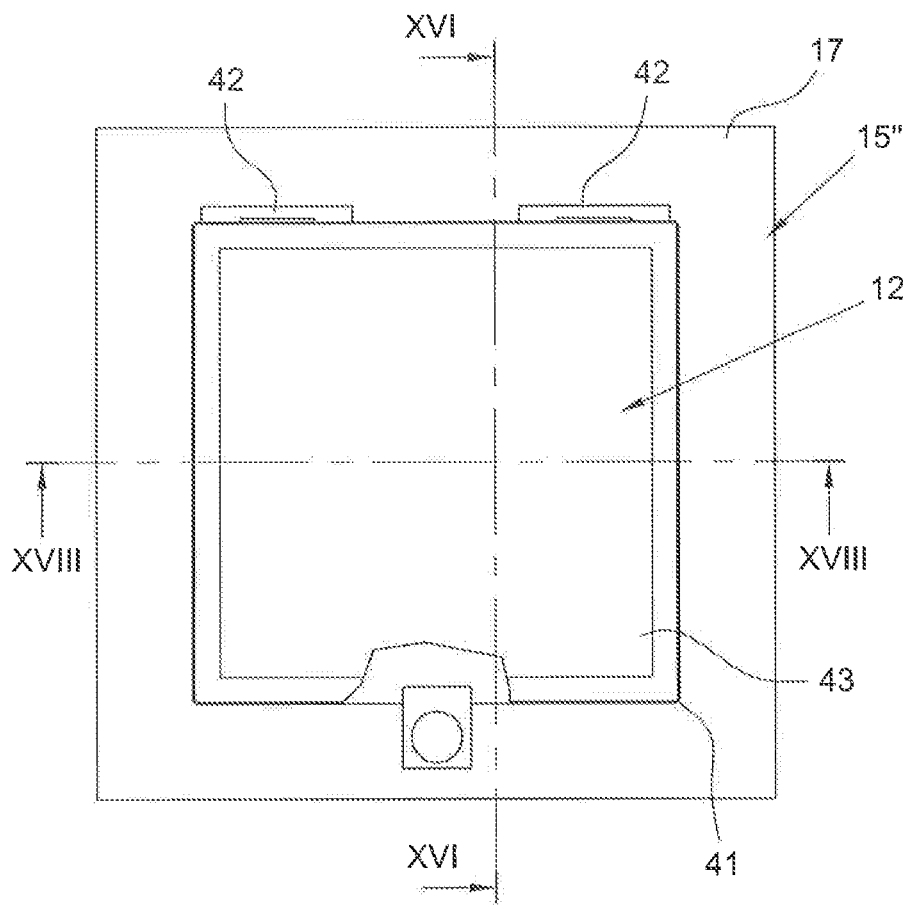
FIGS. 17 and 18 show top and side views of the tile of FIG. 16.
Figure 18:
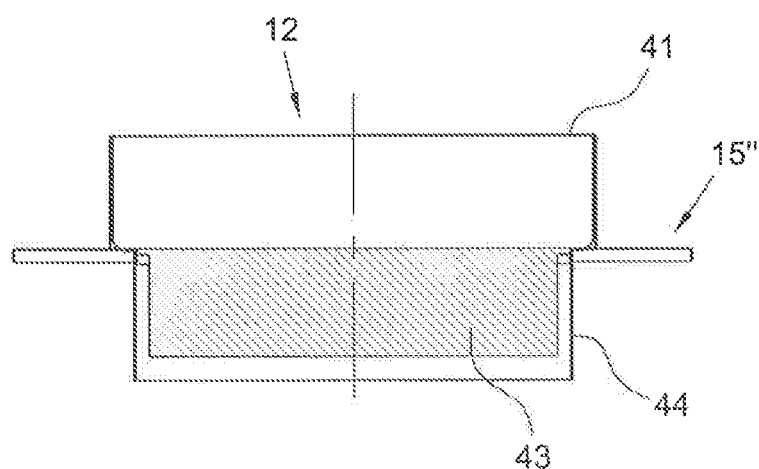
Figure 19:
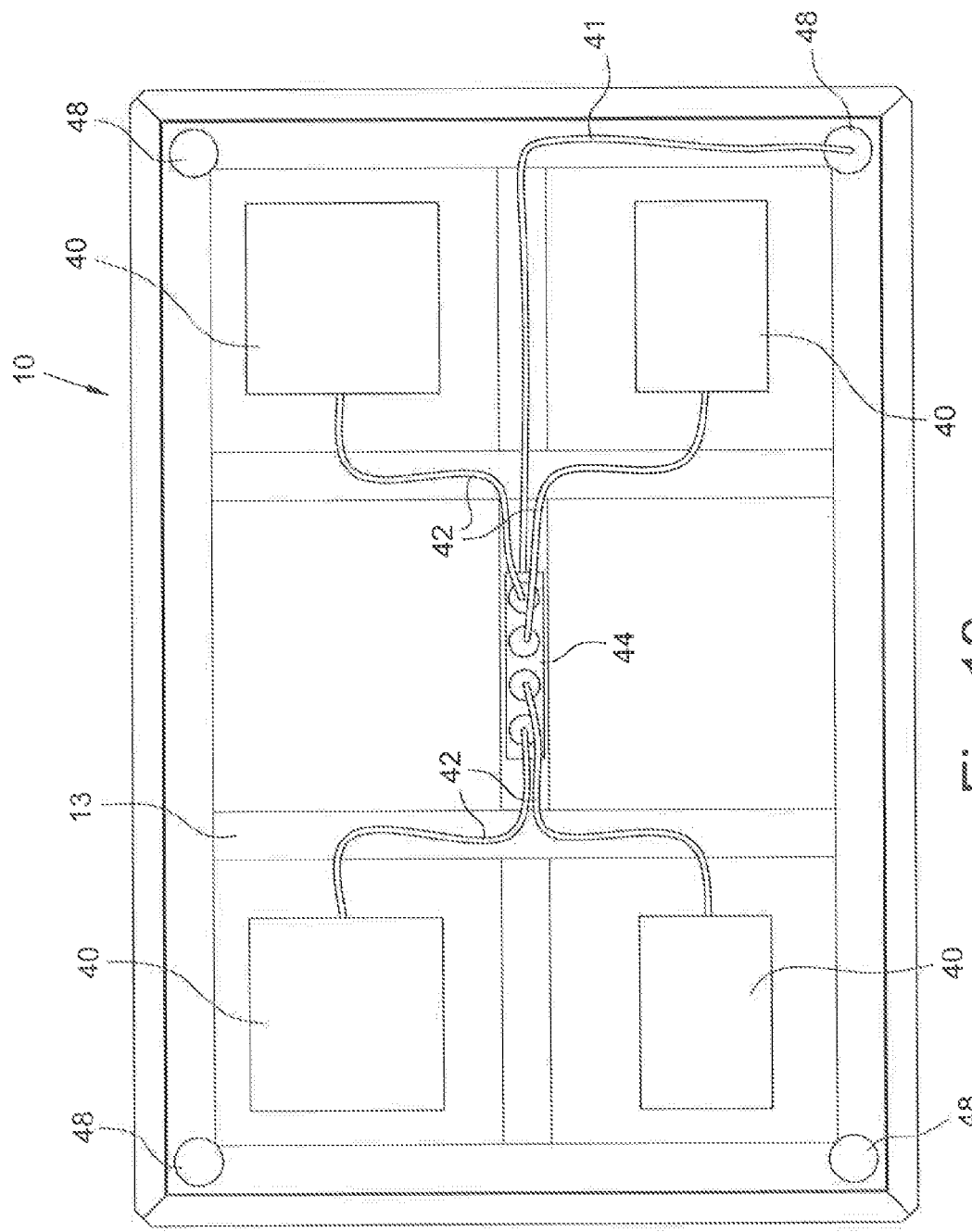
FIGS. 19-22 show an embodiment of a table according to the present invention in which electric connection cables are integrated in a foldaway manner.
Figure 20:
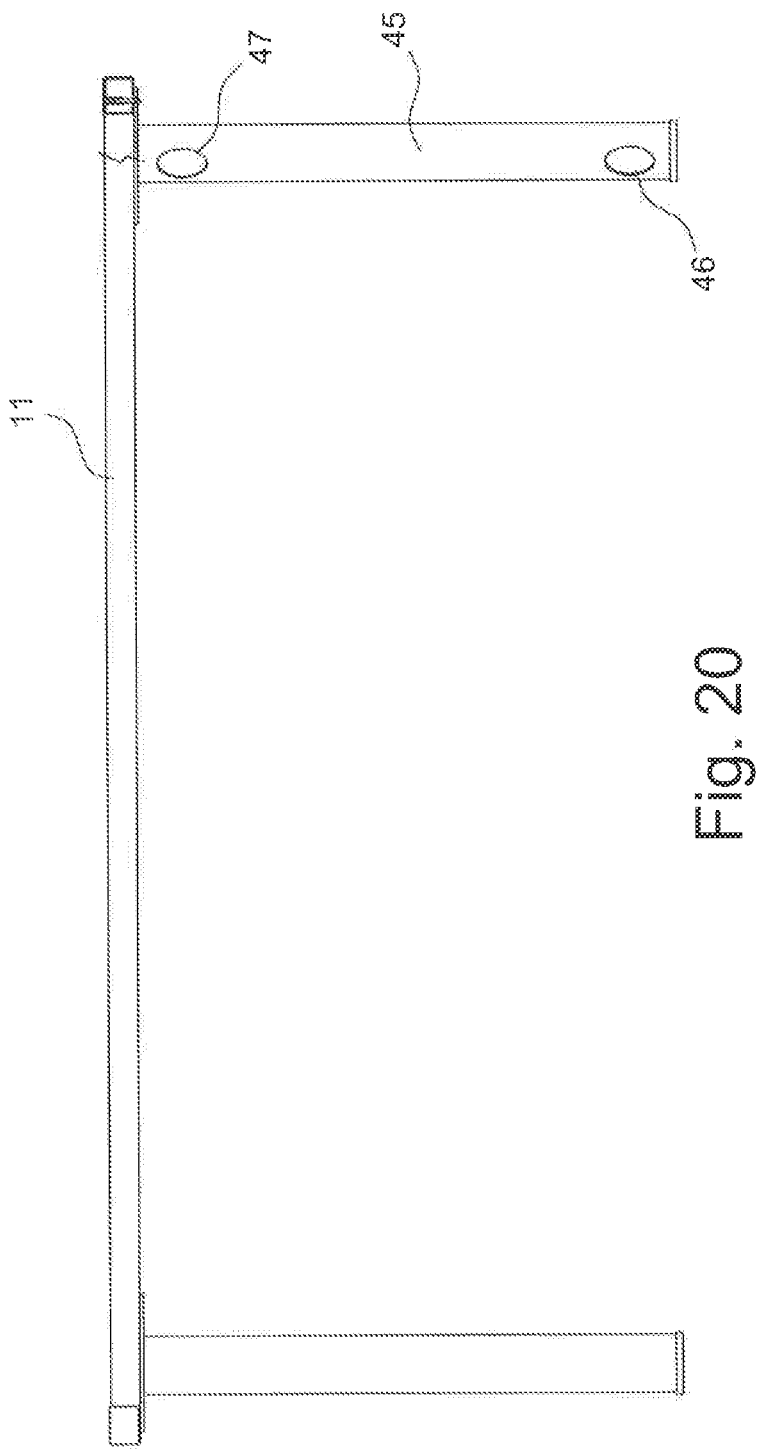
Figure 21:
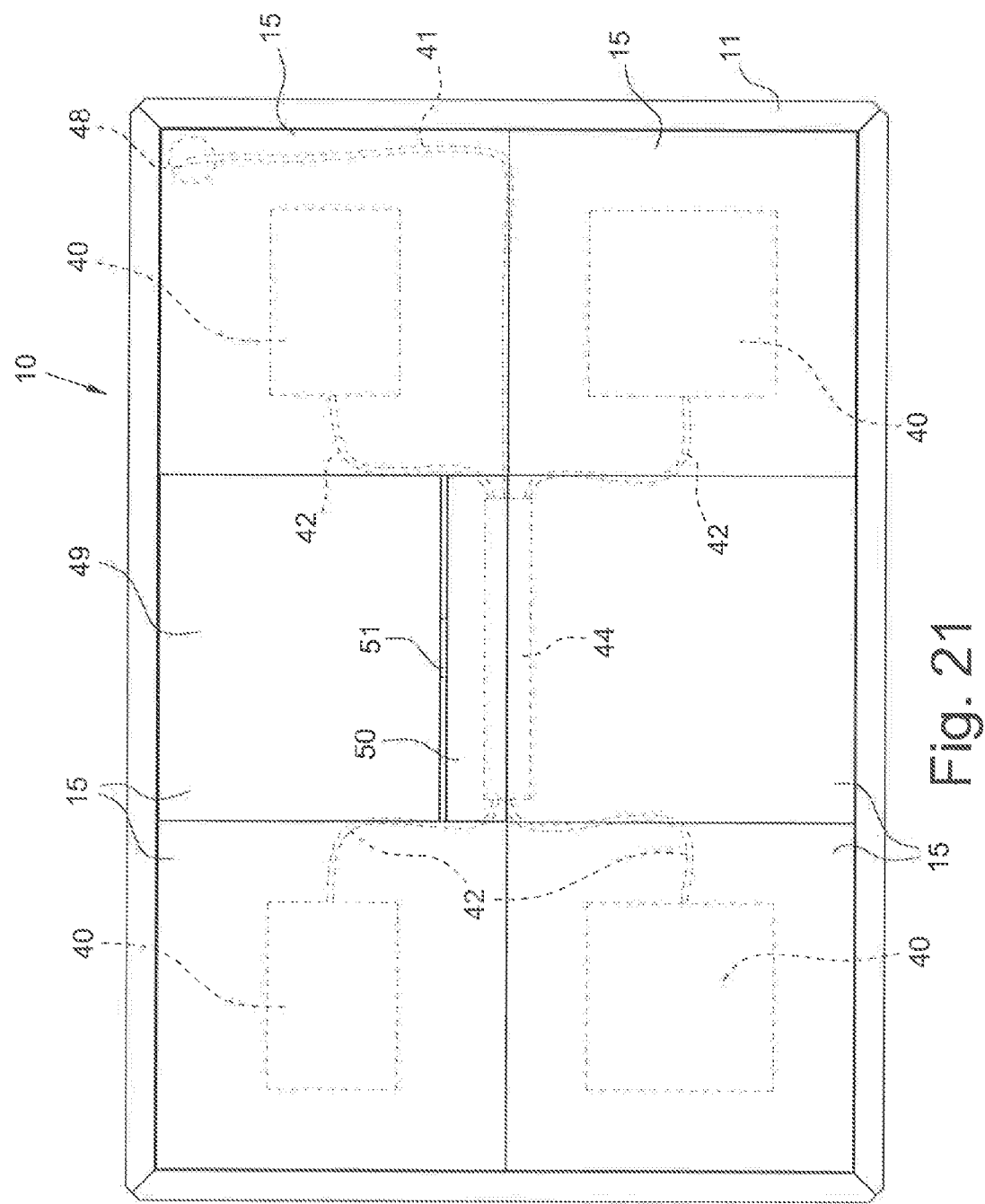
Figure 22:
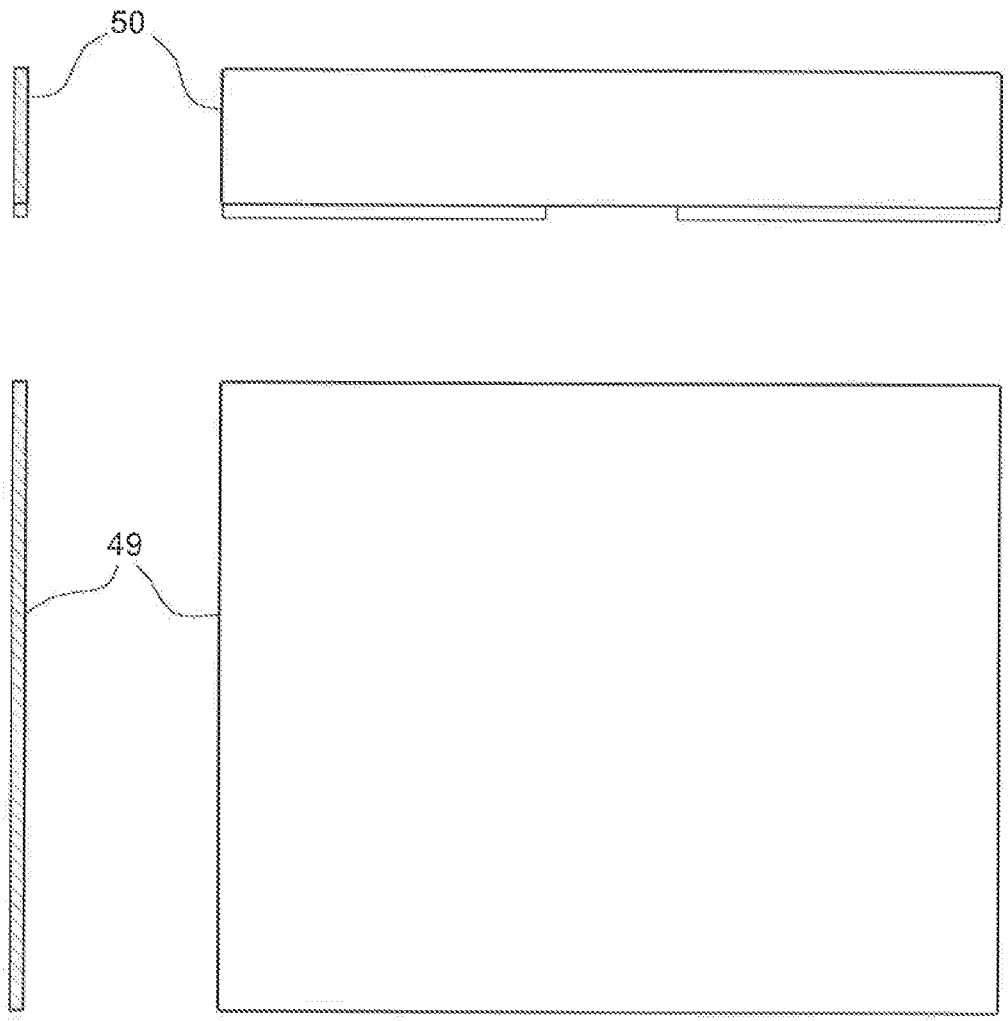
Figure 23:
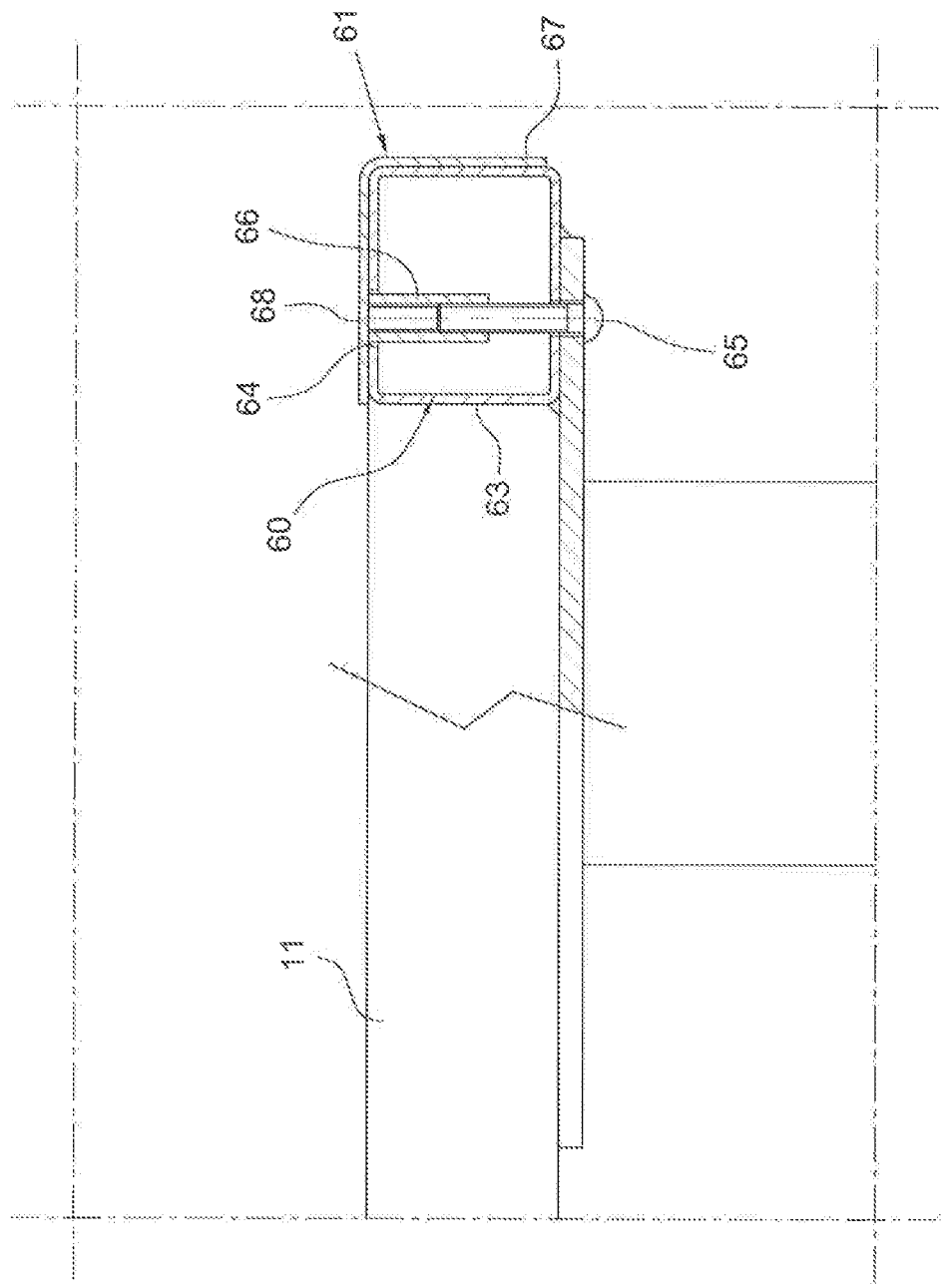
Figure 24:
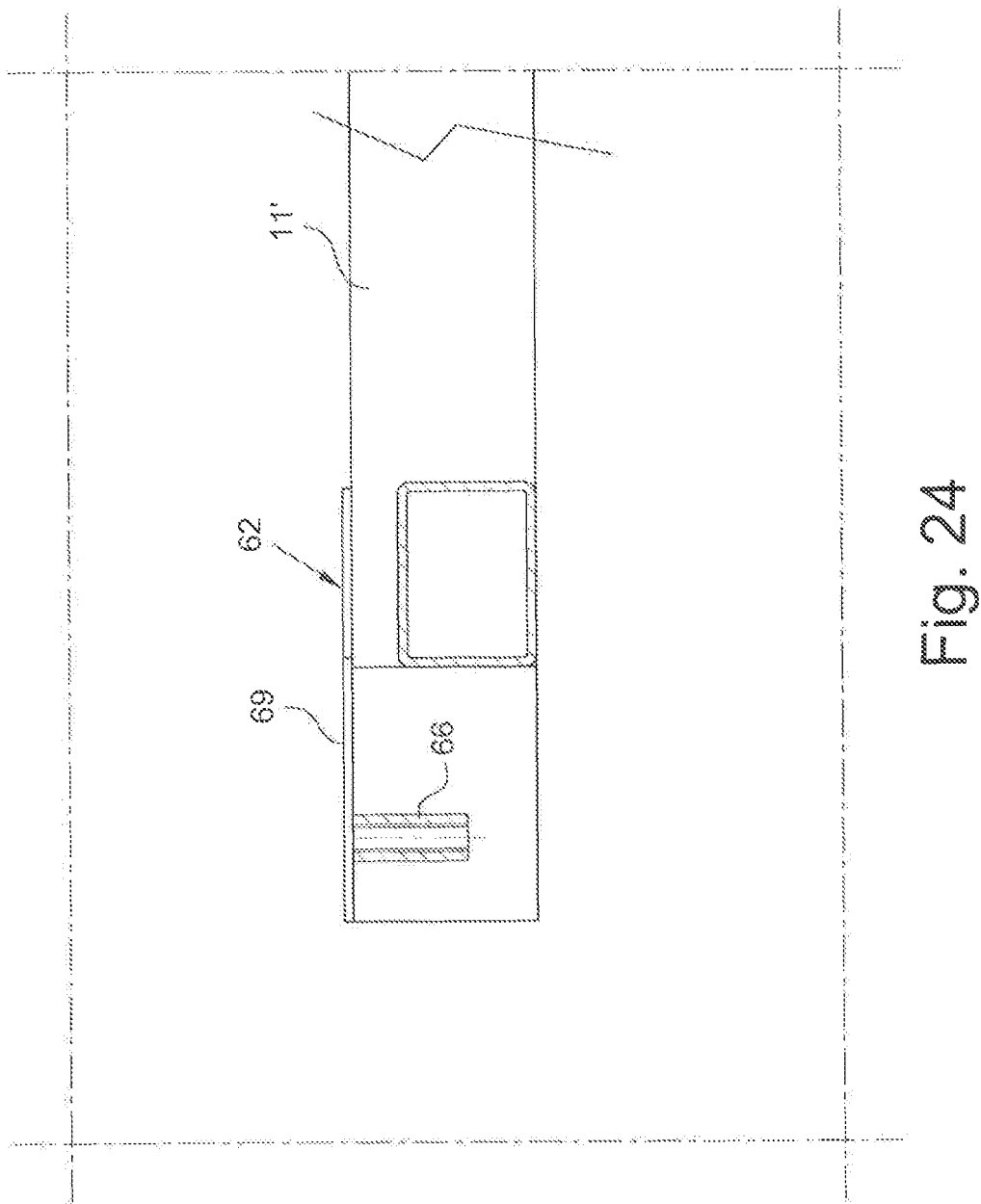
Figure 27:
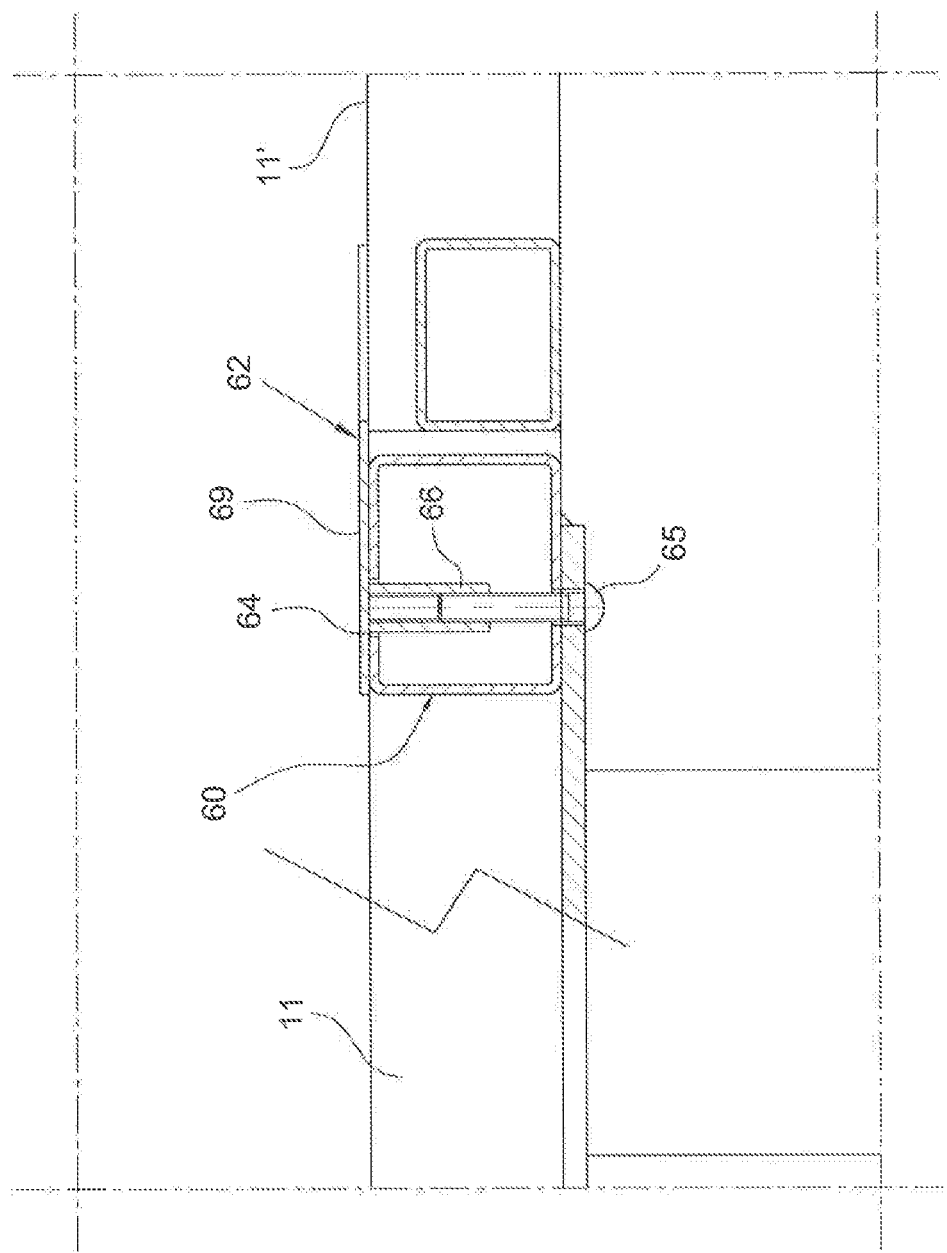
Figure 30:
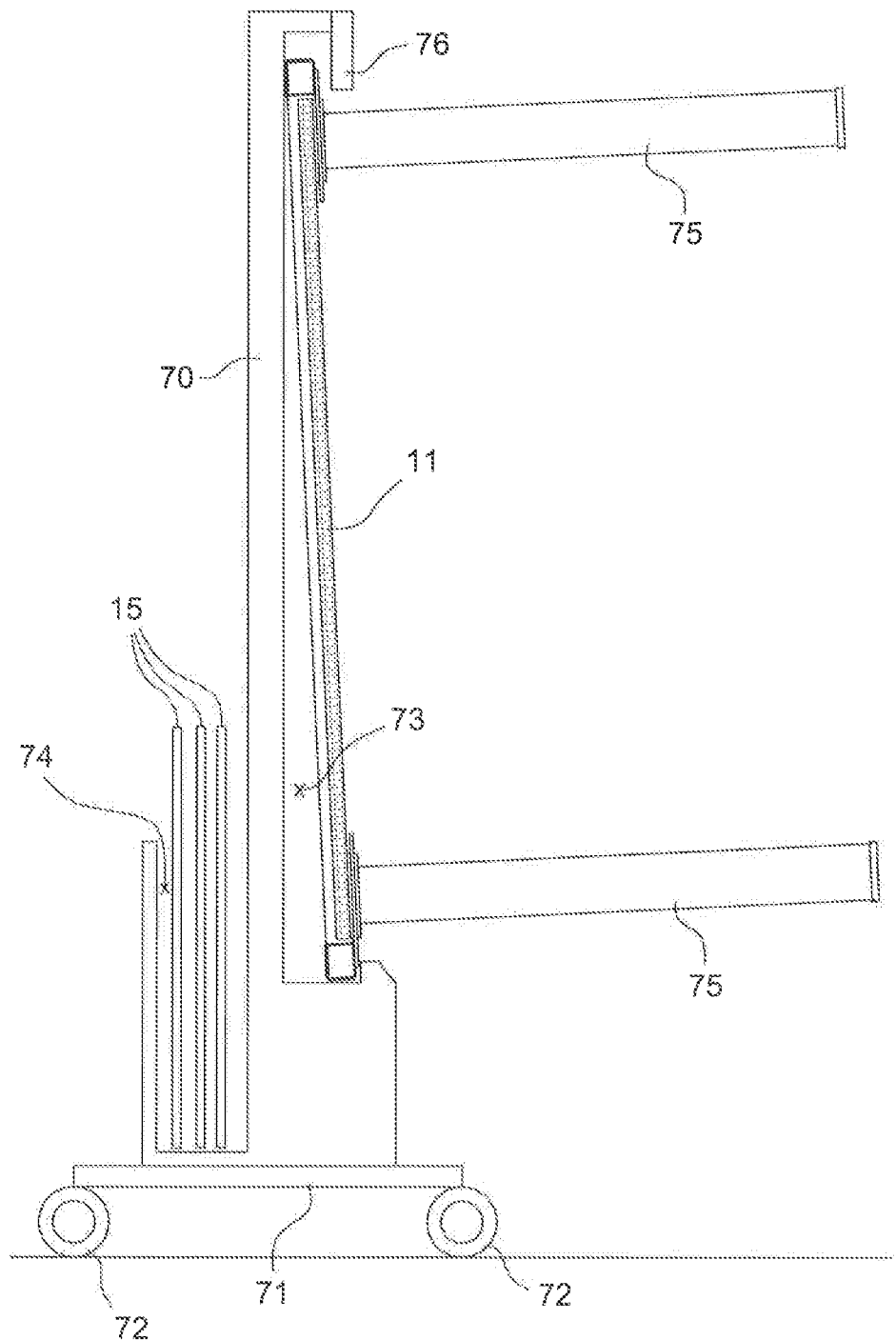
Figure 31:
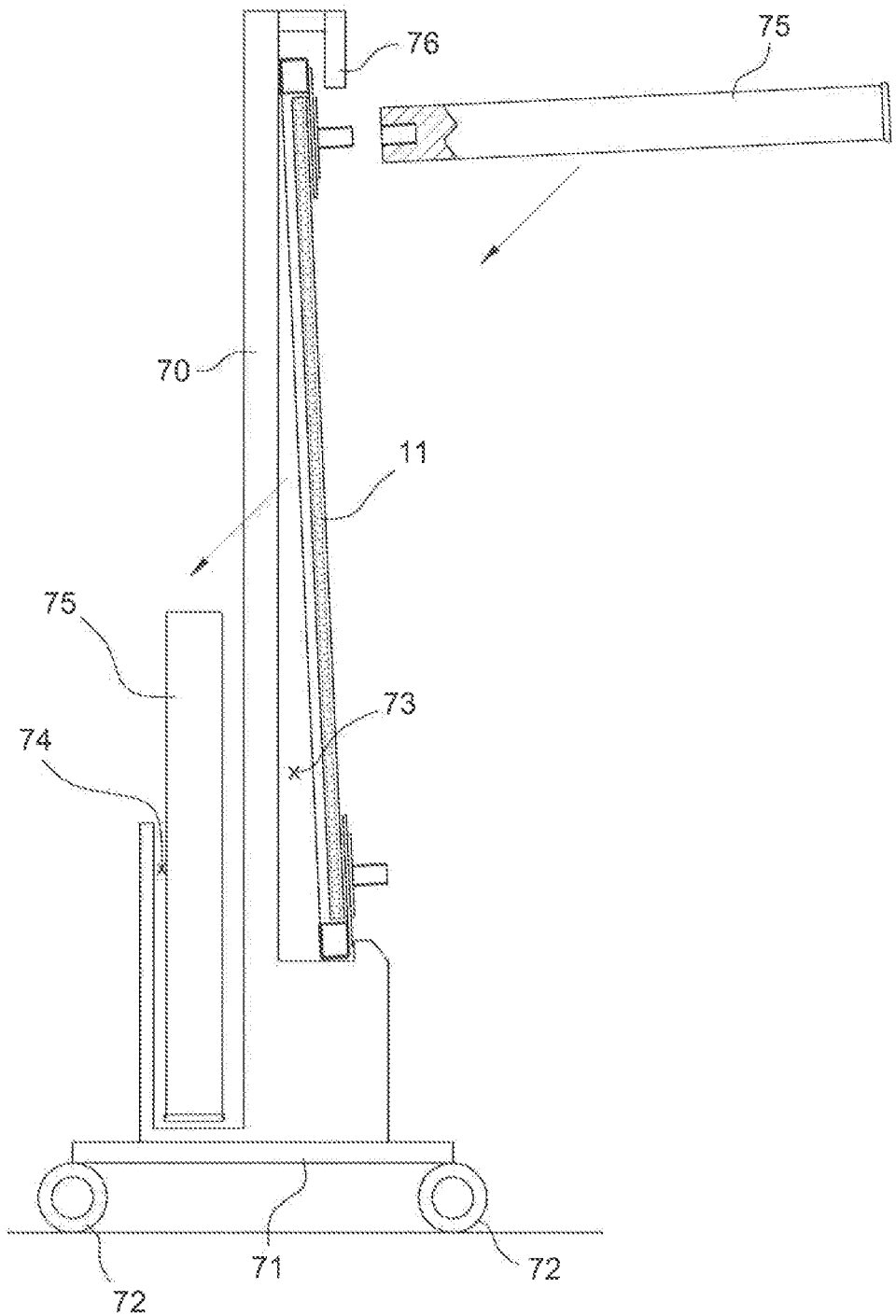

FIGS. 16-18 show e further embodiment of a the 15" that can be associated with the table 10 object of the present invention in which such a the 15" also incorporates a chafing dish 12 as a single piece.

Differently from previous tiles, the aforementioned the 15", which can be defined as a "technical tile" since it can be used exclusively with, the chafing dish 12, is not also necessarily provided with the ceramic portion but can exclusively consist of a steel section bar 17.

As shown in the example of FIG. 16, the invention is provided with at least one hinge 42 for opening the lid. 41 of the chafing dish 12 that is directly connected to the steel section bar 1 of the tile 15".

On the inside this particular the element 15" bears an opening in which a heat source 43 of the induction or electric plate type is built-in. Such a plate 43 rests on bracket elements 45 that are formed inside the tile 15" and it is held laterally by a casing element 44 that can act as a support plane when the tile 15" is unfastened from the table.

FIGS. 19-22 show an embodiment of a table according to the present invention in which electric connection cables are foldaway integrated.

Such an embodiment is provided with at least one heating plate 40 that is current supplied by means of electric cables 41, 42 that are foldaway housed in the table 10.

As visible, the heating plates 40 can be activated in an independent manner thanks no a plug element or to a multiple adaptor-socket 44 from which a plurality of secondary cables 42 derives for current supplying the heating plates 40.

The primary current supply cable 41 supplies the plug element or the multiple adaptor-socket 44, is at least partially housed inside a leg 45 of the table 10 that thus comprises at least one lateral hole 46 for the passage of the primary cable 42 itself.

It can also be foreseen for there to be a second lateral hole 47 at the worktop 11 and an open upper end 48.

At the plug element or multiple adaptor-socket 44 a particular the element 15 is foreseen formed by two portions 49, 50 that are complementarily shaped.

In particular, one portion 50 can be moved in an independent manner with respect to the other 49 so as to identify a first aligned position, in which it conceals the plug element or multiple adaptor-socket 44, and a raised position in which it allows the plug element or multiple adaptor-socket 44 to be accessed for independently turning on at least one heating plate 40.

Possibly, the two portions 49, 50 can be connected to one another in a rot a table manner through a pin or hinge 51.

Finally, the lower frame 13 can comprise housing channels for the secondary cables 42 for current supplying the heating plates 40 which, as can be understood from the description, are of the type which can be removed from the table 10.

FIGS. 23-27 show angular protection and connection elements of the table according to the present invention.

According to such an embodiment the frame is provided with angular elements 60 for removably connecting to angular covering elements 61 or extension elements 62 of the worktop 11.

In particular she angular connection elements 60 comprise perimetrical metal section bars 63 that are welded to one smother said are provided, at the angles of the table, with through holes 64.

Such holes 64 on one side receive the angular covering elements 61 or extension elements 62 said on the other side receive a threaded locking element 65 that can release the coupling.

As shown, the angular covering elements 61 or extension elements 62 comprise a sleeve-portion 66, which is closed at the top, for being inserted in the hole 64 and for receiving the threaded element 65.

When dealing with an angular coating 61, these consist of small thin metal section elements that are folded for covering the sides and the too of the angular connection elements 60.

In the case of extension elements 62, these extend from a second worktop 11' and are provided with a laminar element 69 that is perimetrically provided with the sleeve 66 for being inserted in the hole 64.

As visible in FIGS. 23-27 the couplings with the Singular covering elements 61 and with the extension elements 62 are completely similar to one another and are determined by a threaded coupling in a bush inserted in a receiving hole that is formed on the angles of the table 10.

Figure 34:
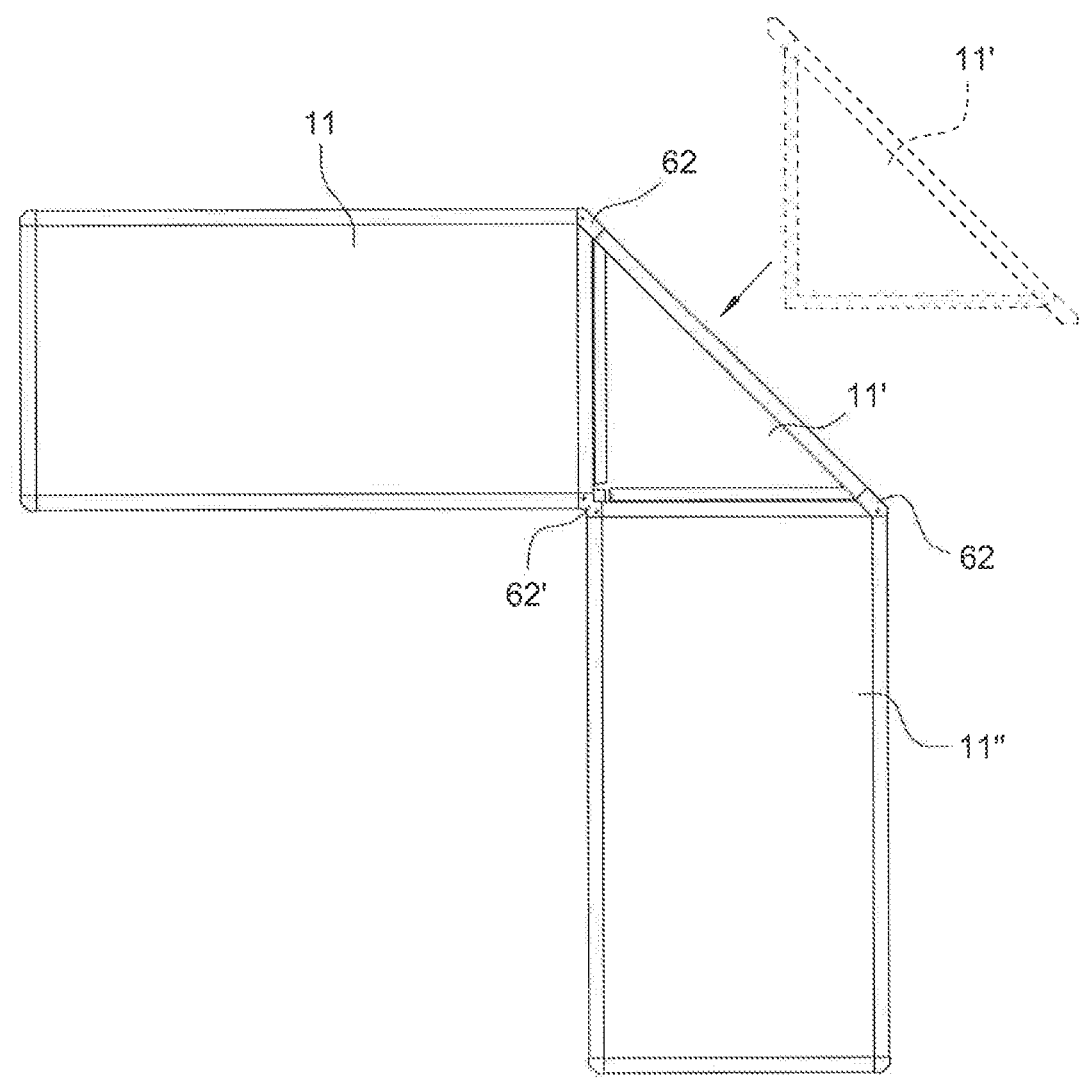
Figure 35:
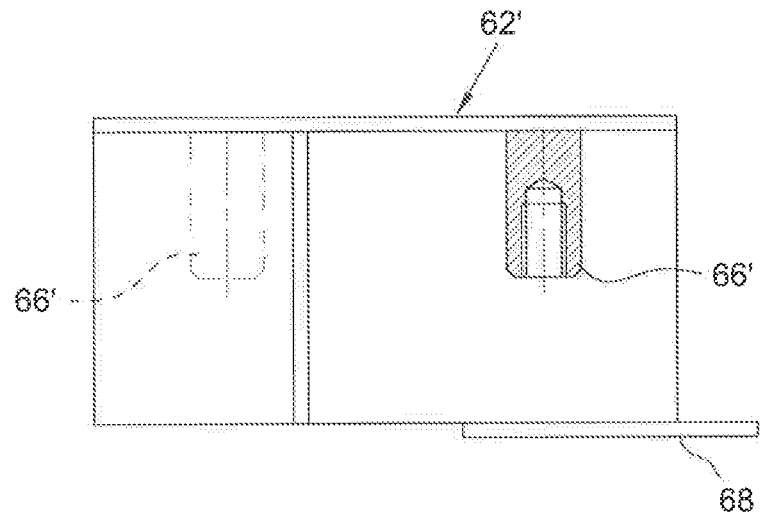
Figure 36:
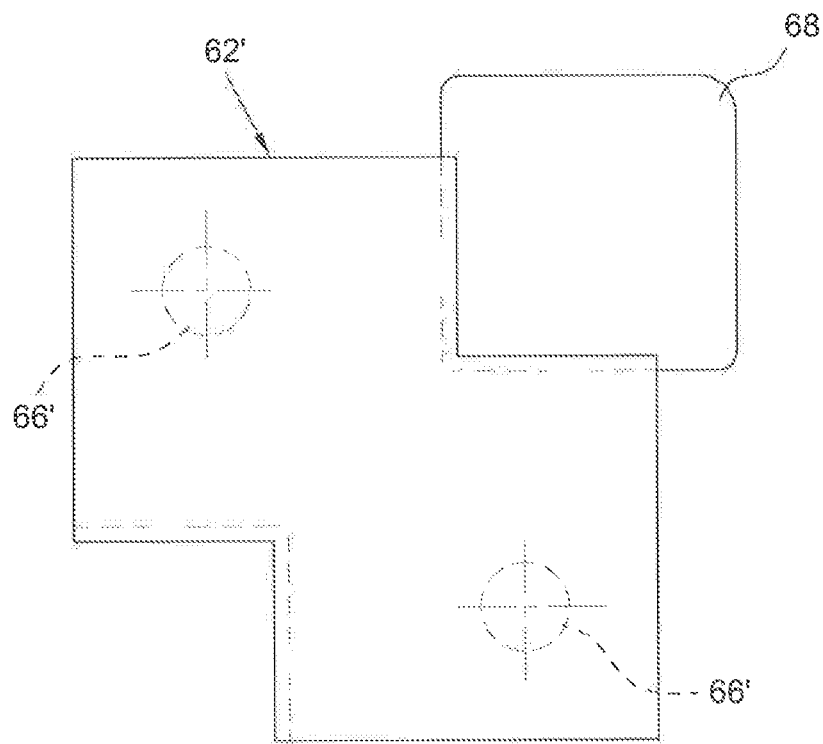
Figure 37:
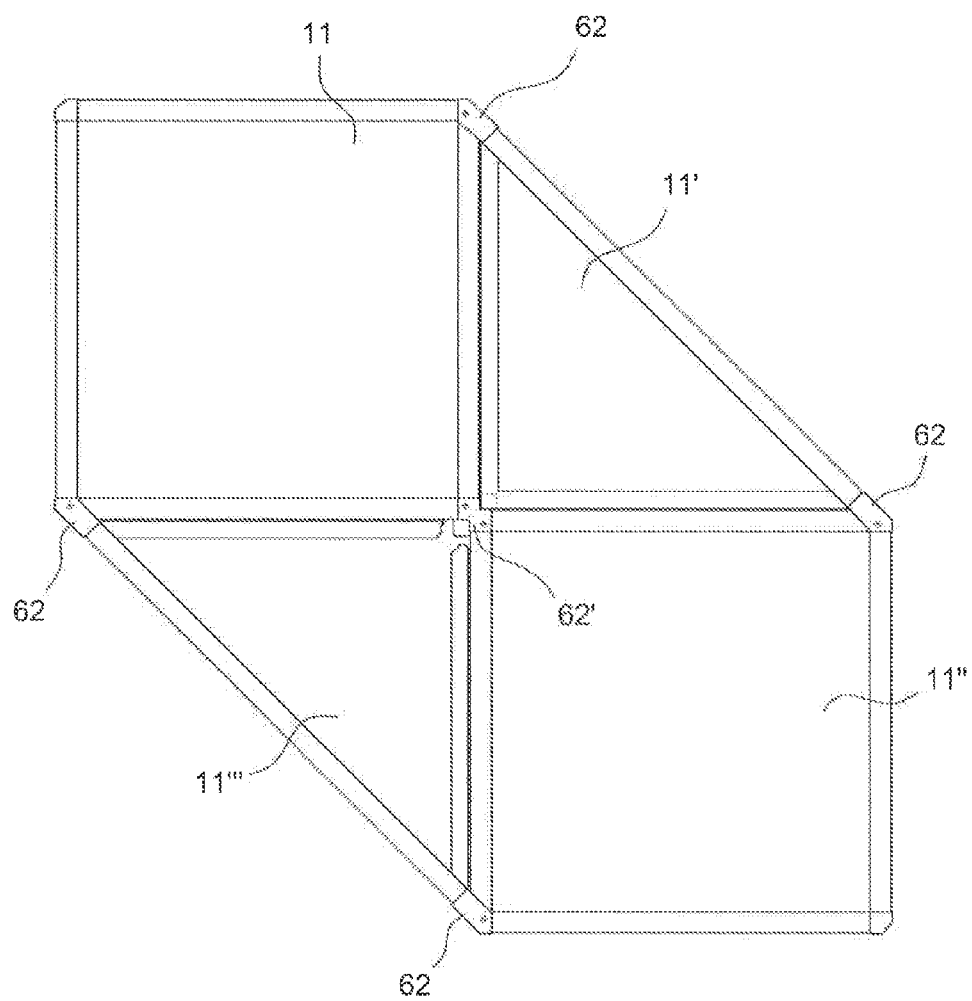
Figure 38:
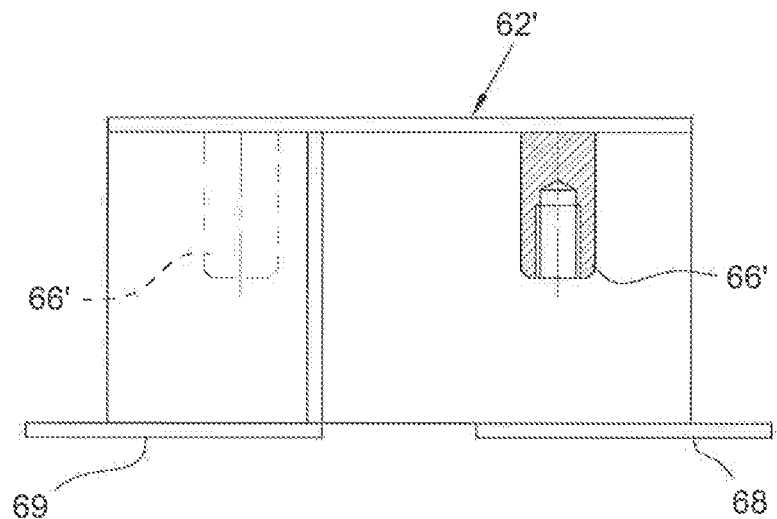
Figure 39:
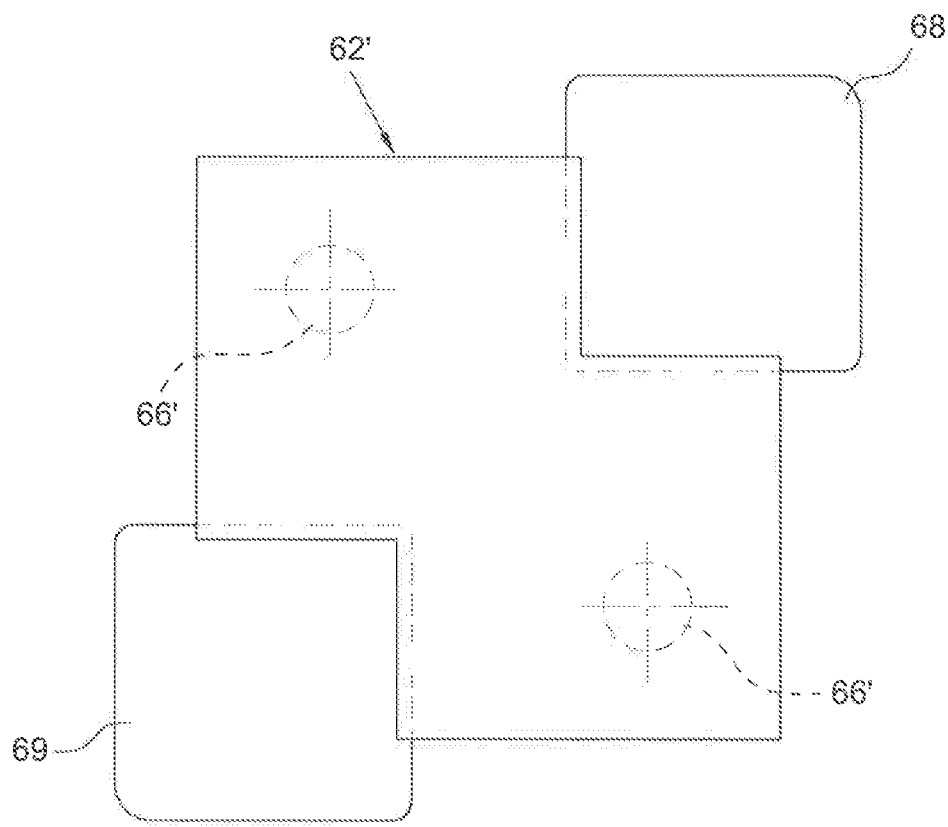
Figure 40:
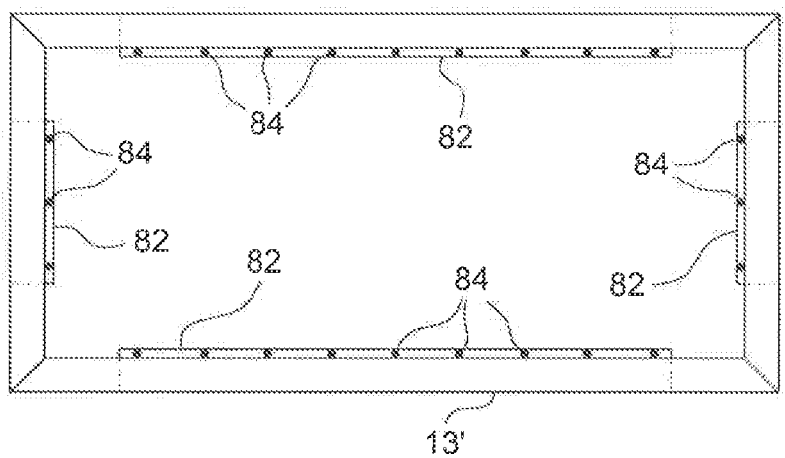
FIGS. 40-45 show the elements that make it possible to modify the housings of the table for receiving the removable accessories as desired.
Figure 41:
Figure 42:
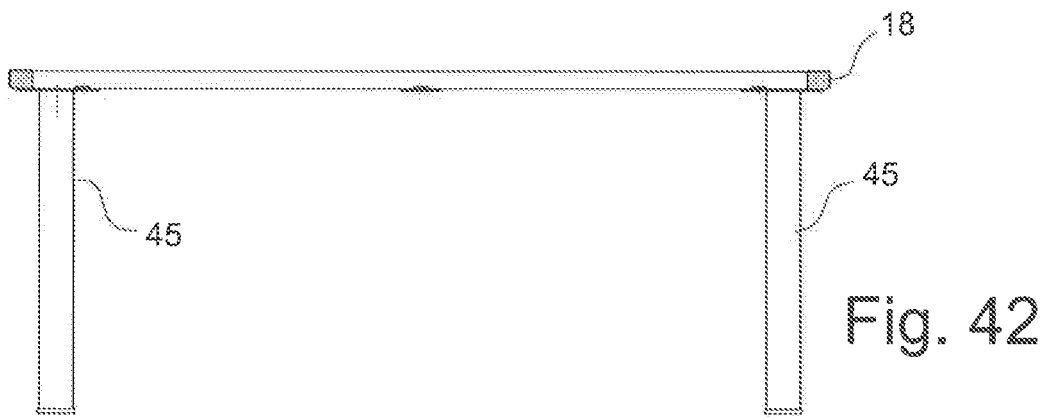
Figure 43:
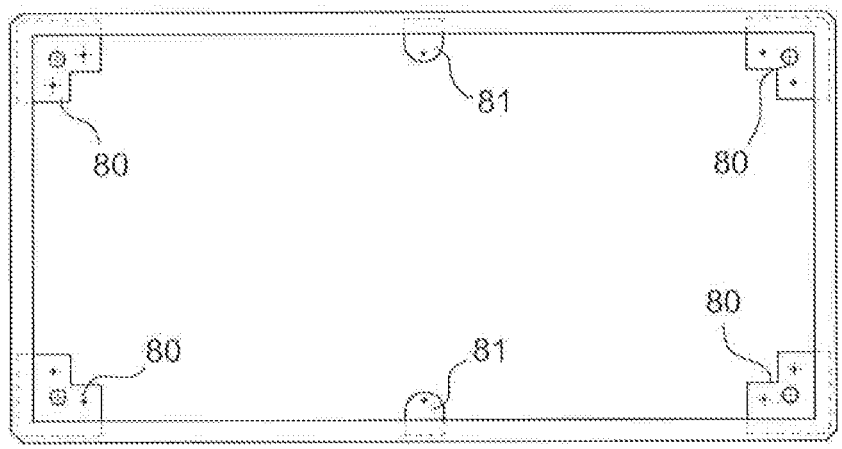
Figure 44:
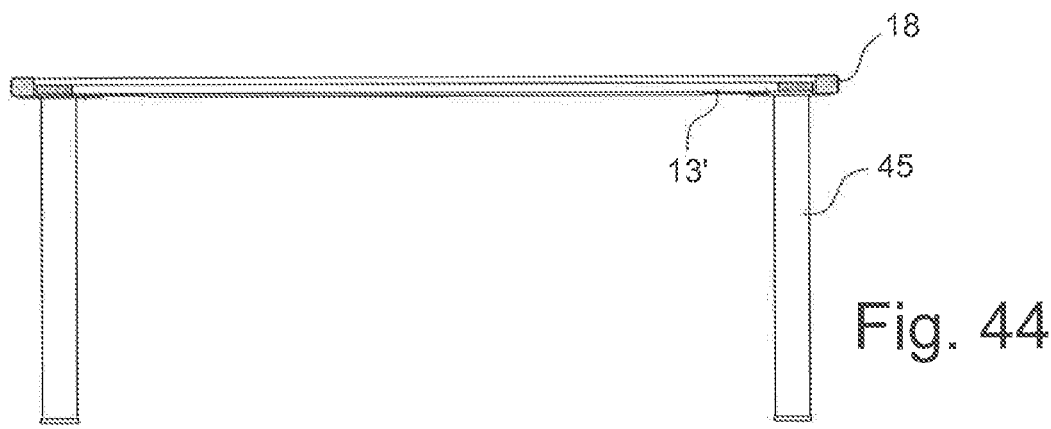
Figure 45:
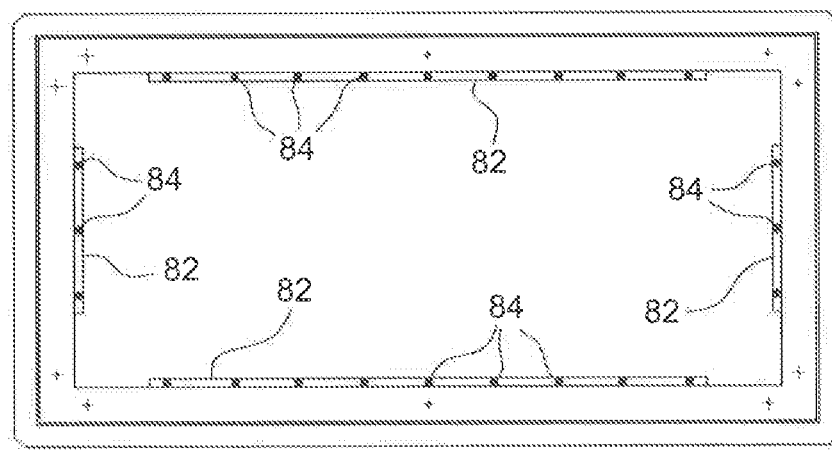
Figure 46:
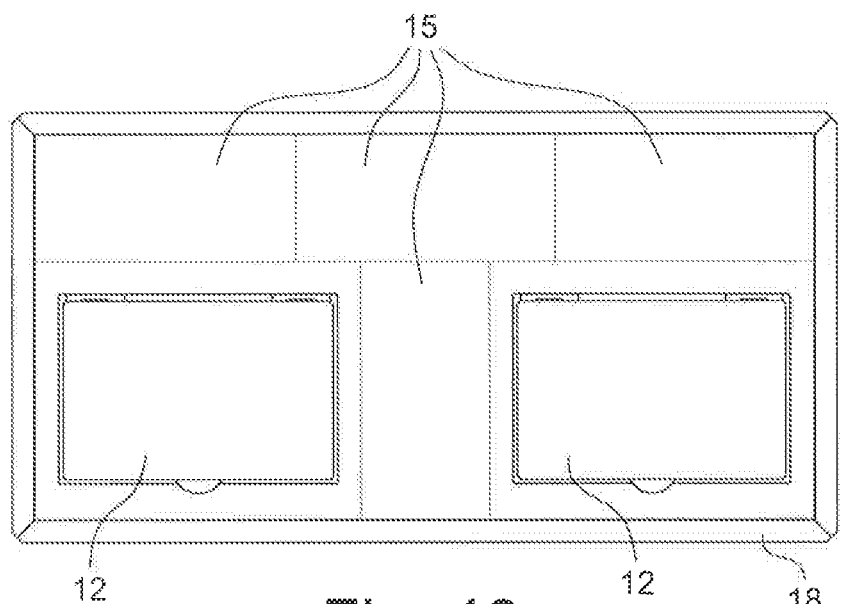
FIGS. 46-55 show some possible configurations of the table modifying the housings of the table for receiving removable accessories as desired.
Figure 47:
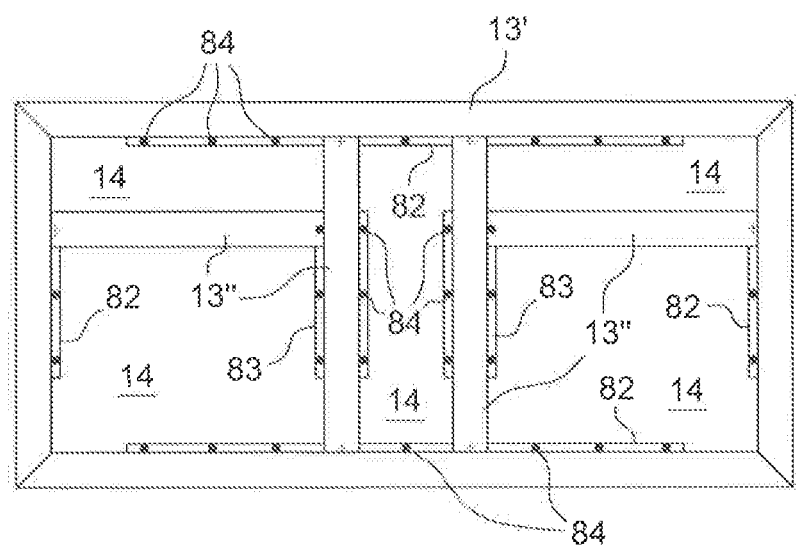
Figure 48:
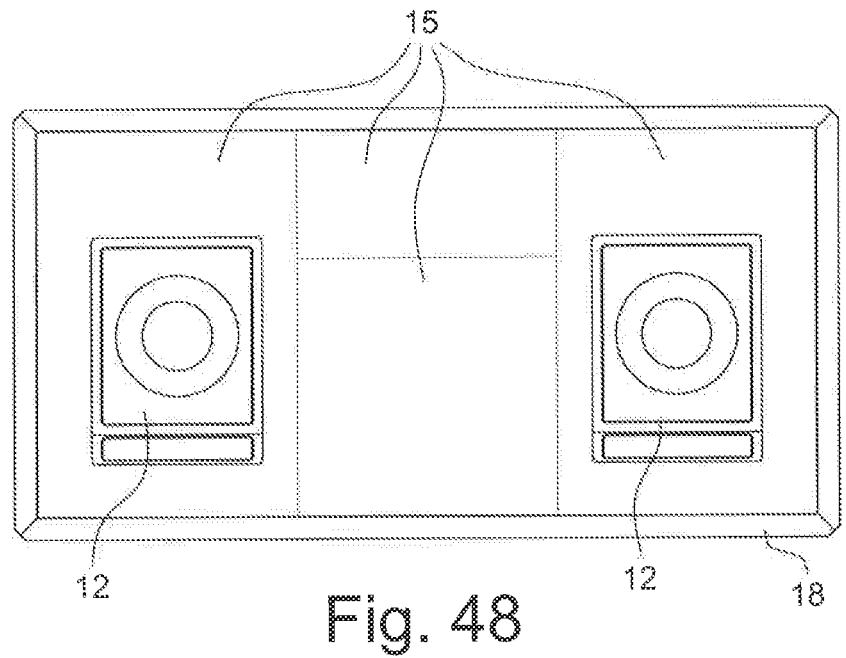
Figure 49:
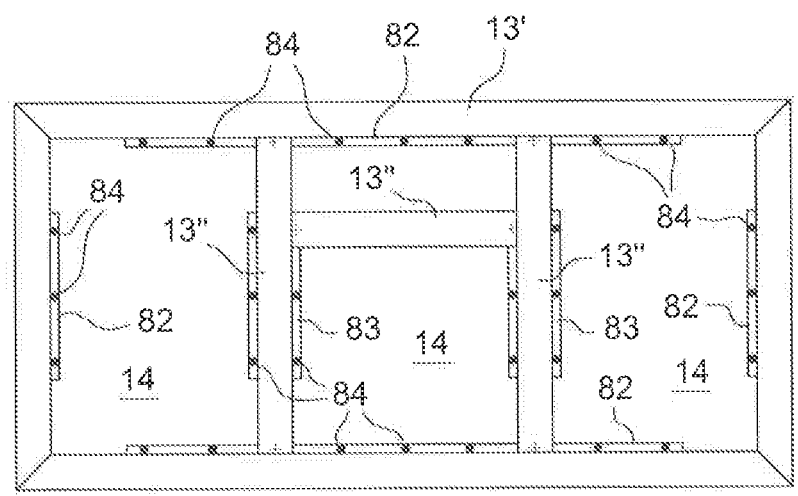
Figure 50:
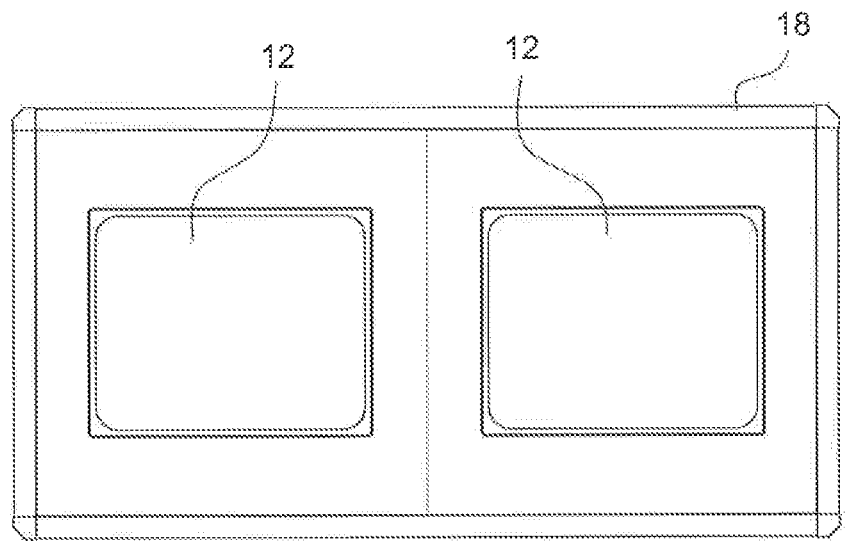
Figure 51:
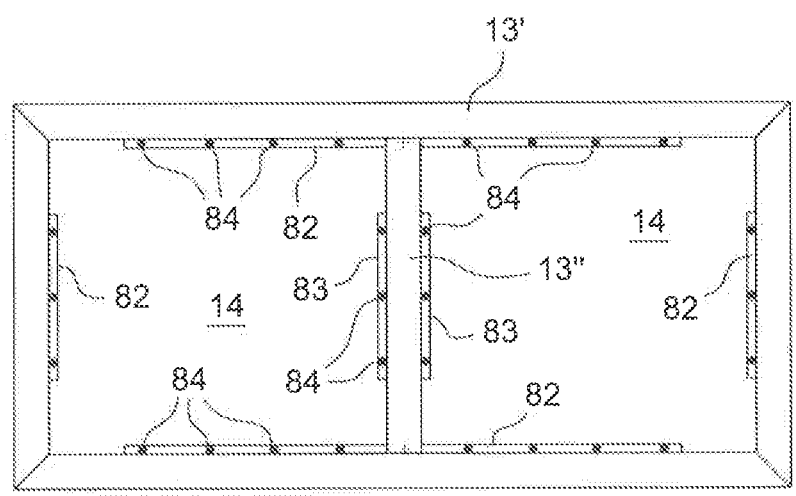
Figure 52:
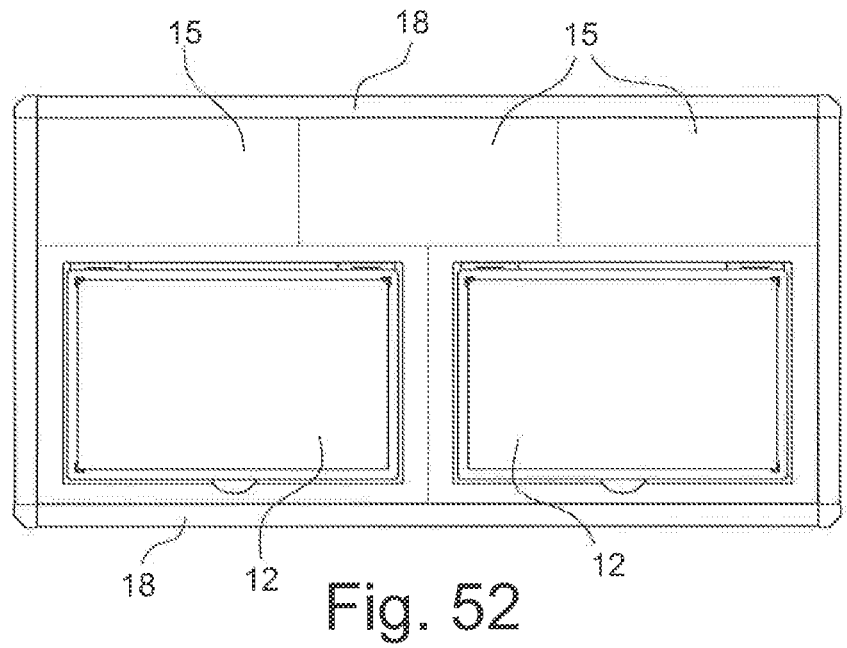
Figure 53:
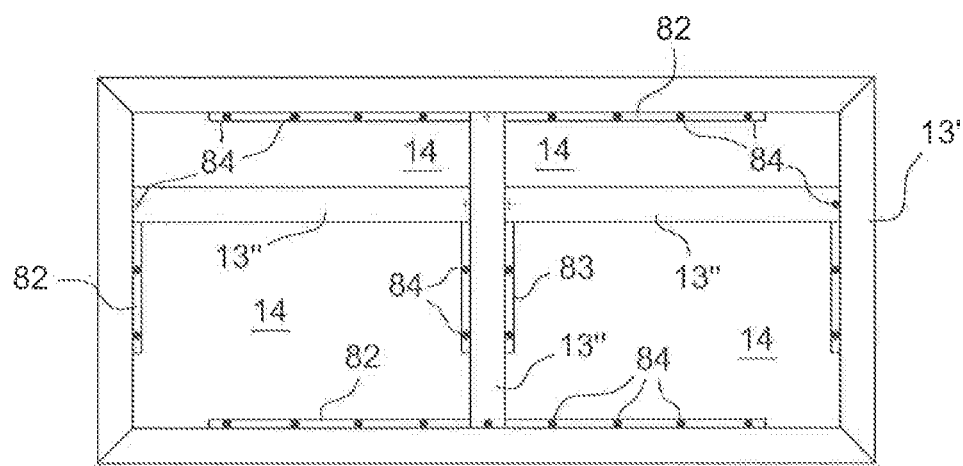
Figure 54:
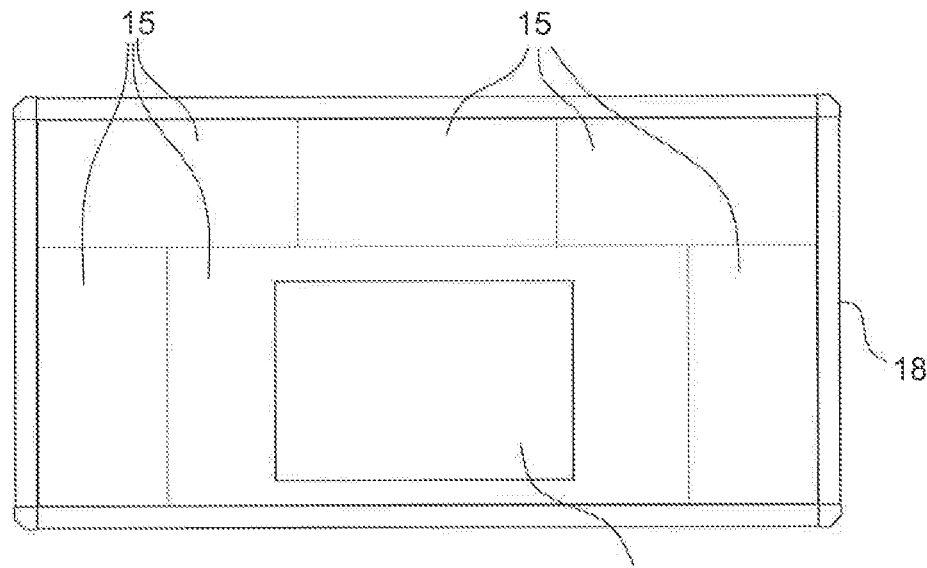
Figure 55:
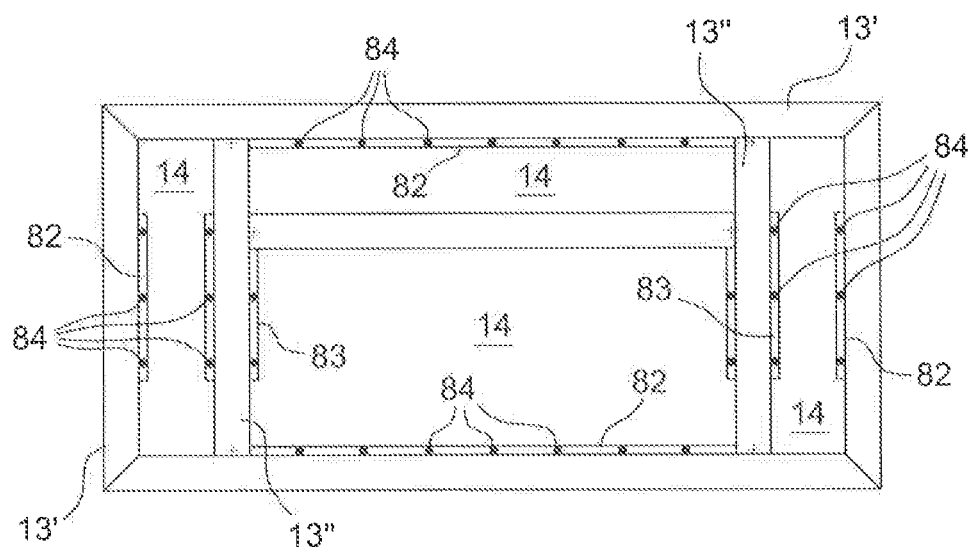

FIGS. 34-39 show angular connection and protection elements of the table according to the present invention suitable for making a group of L-shaped tables, FIGS. 34-36, or actual visual displays, FIGS. 37-39.

In such a case the extension elements 62' that are configured to make such L-shaped groups or visual displays foresee two sleeve portions 66' that are formed in positions that are diametrically opposite one another so as to be inserted in relative holes 64 formed in different tables 11', 11".

From a geometrical point of view, such extension elements 62' are elements having a parallelepiped-shaped base in which at two opposite angles sleeve portions 66' are formed, whereas the remaining two angles are lowered or built-in inside the element itself 62'.

At such lowered or built-in angles, one or two support elements 68, 69 are provided respectively used as a connection to the remaining tables 11', 11", 11'" according to whether an L-shaped group or a visual display is desired to be made.

FIGS. 28-33 show an innovative trolley for disassembling, transporting and storing with small bulk the table according to the present invention.

In particular, such a trolley comprises a vertical separation element 70 that is provided with a base 71 equipped with wheels 72 in which the vertical separation element 70 on one side identifies a first housing 73 for receiving the worktop 11 and on the opposite side a second housing 74 for storing the tile elements 15.

The first housing 73 is C-shaped and comprises an upper side 76 that is mobile between a raised position so as to allow the worktop 11 to be inserted in the first housing 73 itself, and a lowered position in which it provides for stably holding the worktop 11.

The second housing 74 for storing the tile elements 15 is on the other hand U-shaped with fixed walls.

Advantageously, such a second housing 74 can also house the removable legs 75 of the table 10.

Thanks to the trolley, as described above, the operations of disassembling, transporting and storing the table 10 with small bulk, can be carried out with simple steps, like:

removing the tile elements 15 from the worktop 11 and positioning them in the second U-shaped housing 74;

inserting the worktop 11 in the first C-shaped housing 73 and constraining it in such a position;

removing the legs 75 of the table 10 housed in the first housing 73 and arranging them in the second U-shaped housing 74;

In particular, the step of constraining the worktop 11 in the first C-shaped housing 73 comprises the simple operations of:

lifting the upper end 75 of the first C-shaped housing 73;

inserting the worktop 11 in the first C-shaped housing 73 with the upper end (76) raised;

lowering the upper end 76 of the first C-shaped housing 73.

Figure 56:
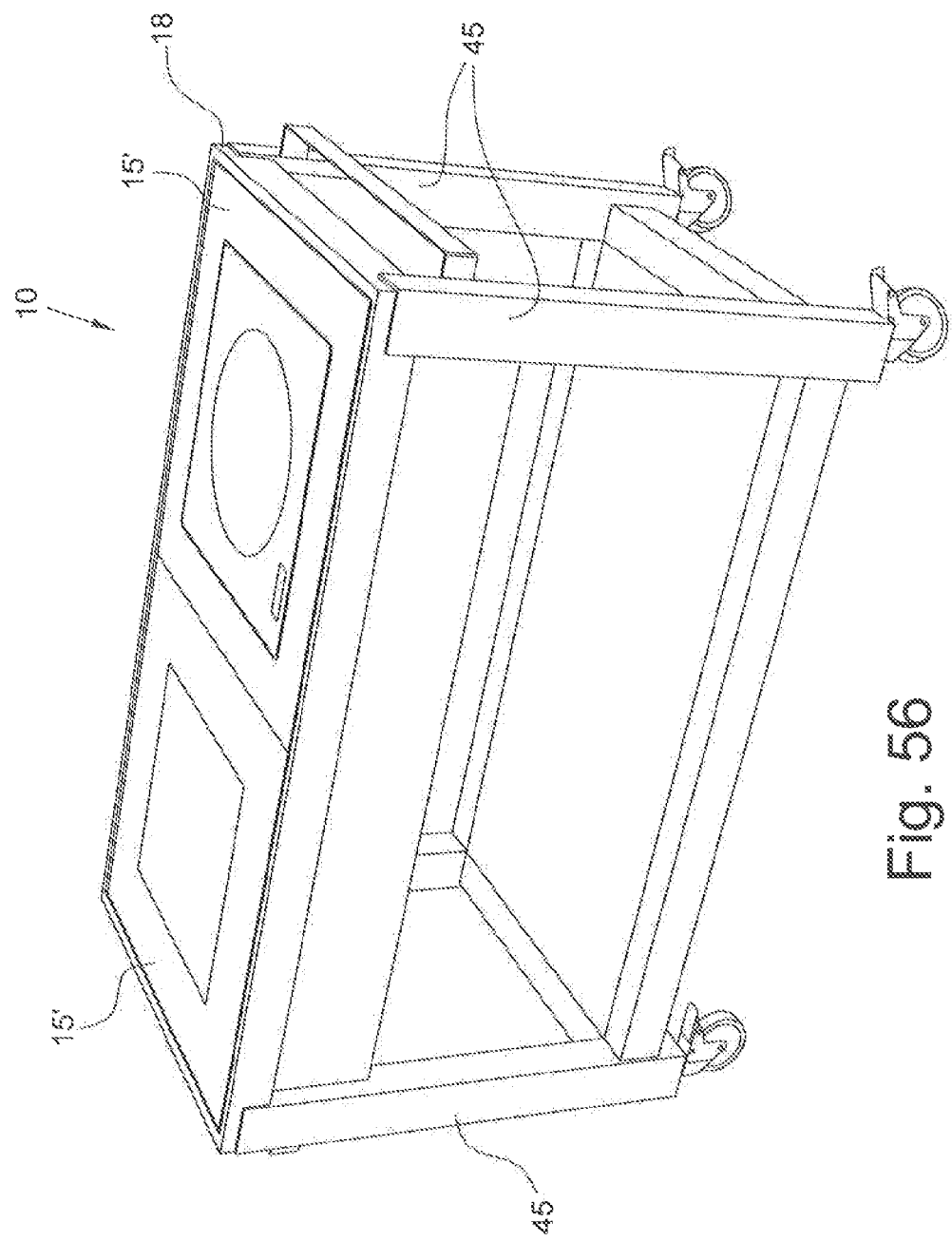
FIGS. 56 and 57 show a trolley and a mobile station provided with the worktop of the present invention.
Figure 57:
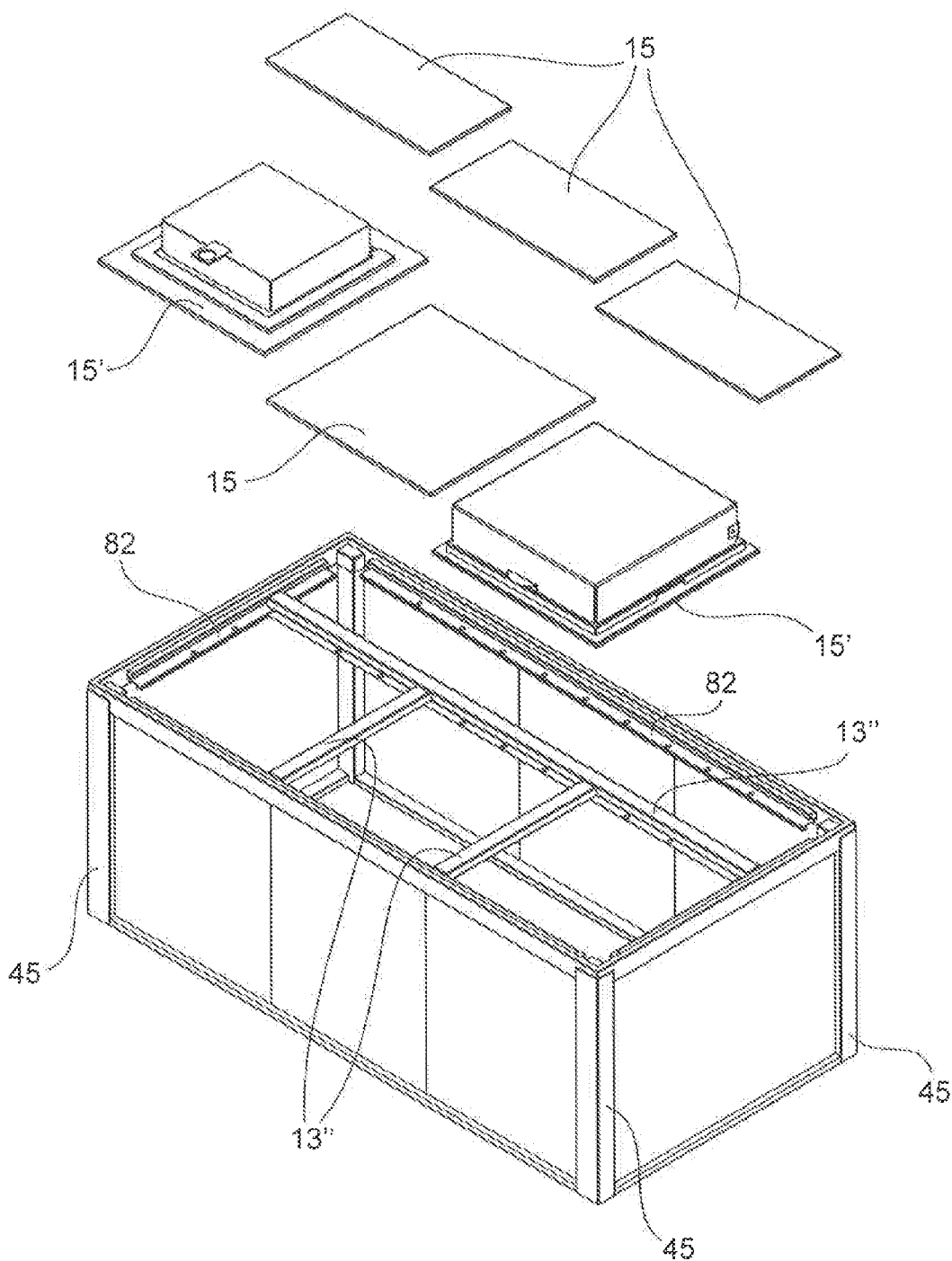

Finally, the term table also means mobile structures in the form of a table, like for example trolleys, FIG. 56, or mobile modular station, FIG. 57.

Of course such trolleys or mobile modular stations have, as their worktop, the work plane that was previously described in the present invention.

It is very easy to understand how the multiuse table operates, in particular for supporting removable accessories, and of the tile element that can be associated with such a table in a removable manner.

Figure 2:
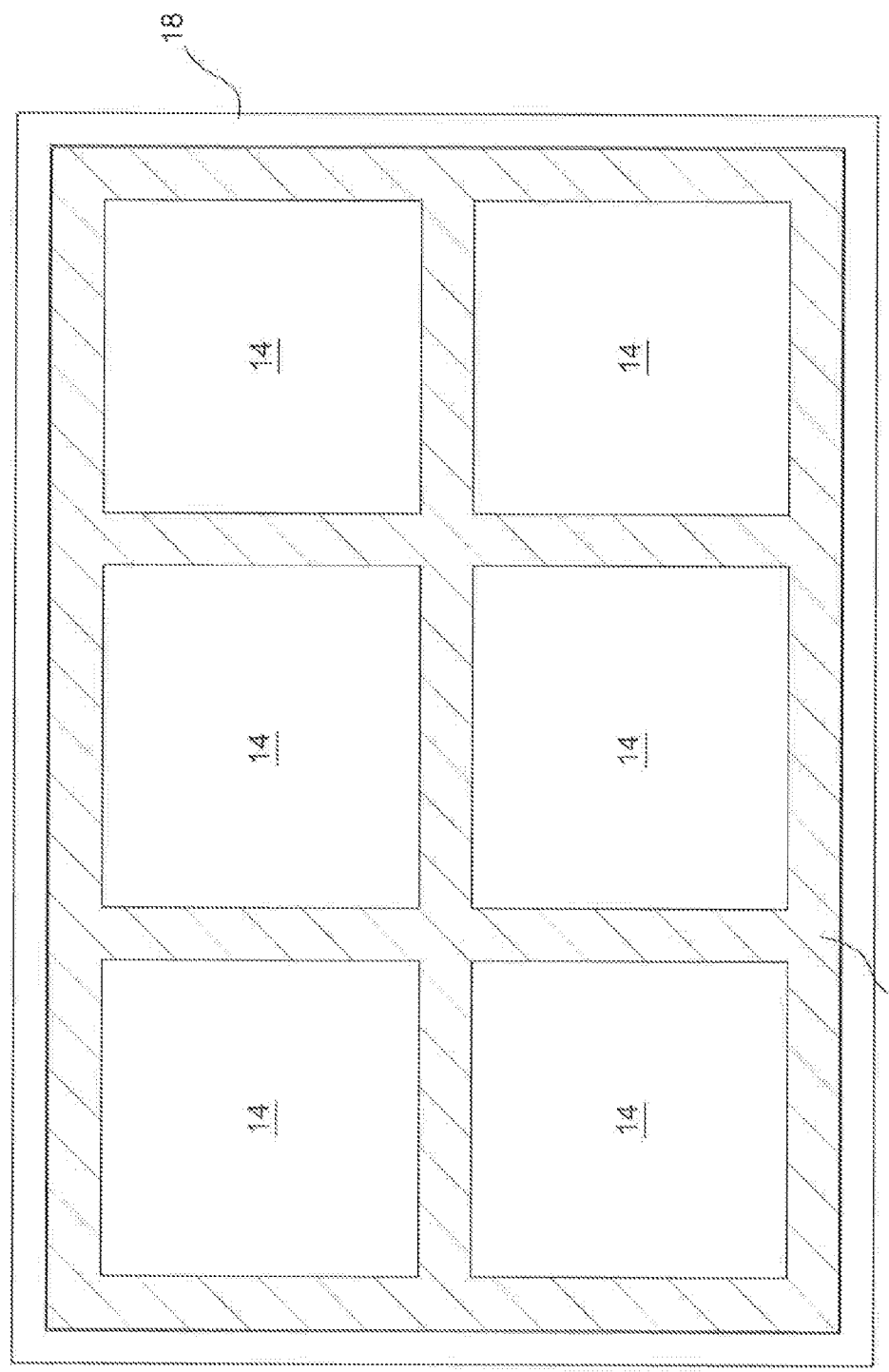
FIG. 2 is a top view of the lower frame of the table of FIG. 1.

As described previously, the worktop 11 according to the invention consists of a lower frame 13, provided with a plurality of openings 14, which are visible in FIG. 2, and of a plurality of removable file elements 15 that are supported on such a lower frame 13 in mutual lateral contact.

Figure 3:
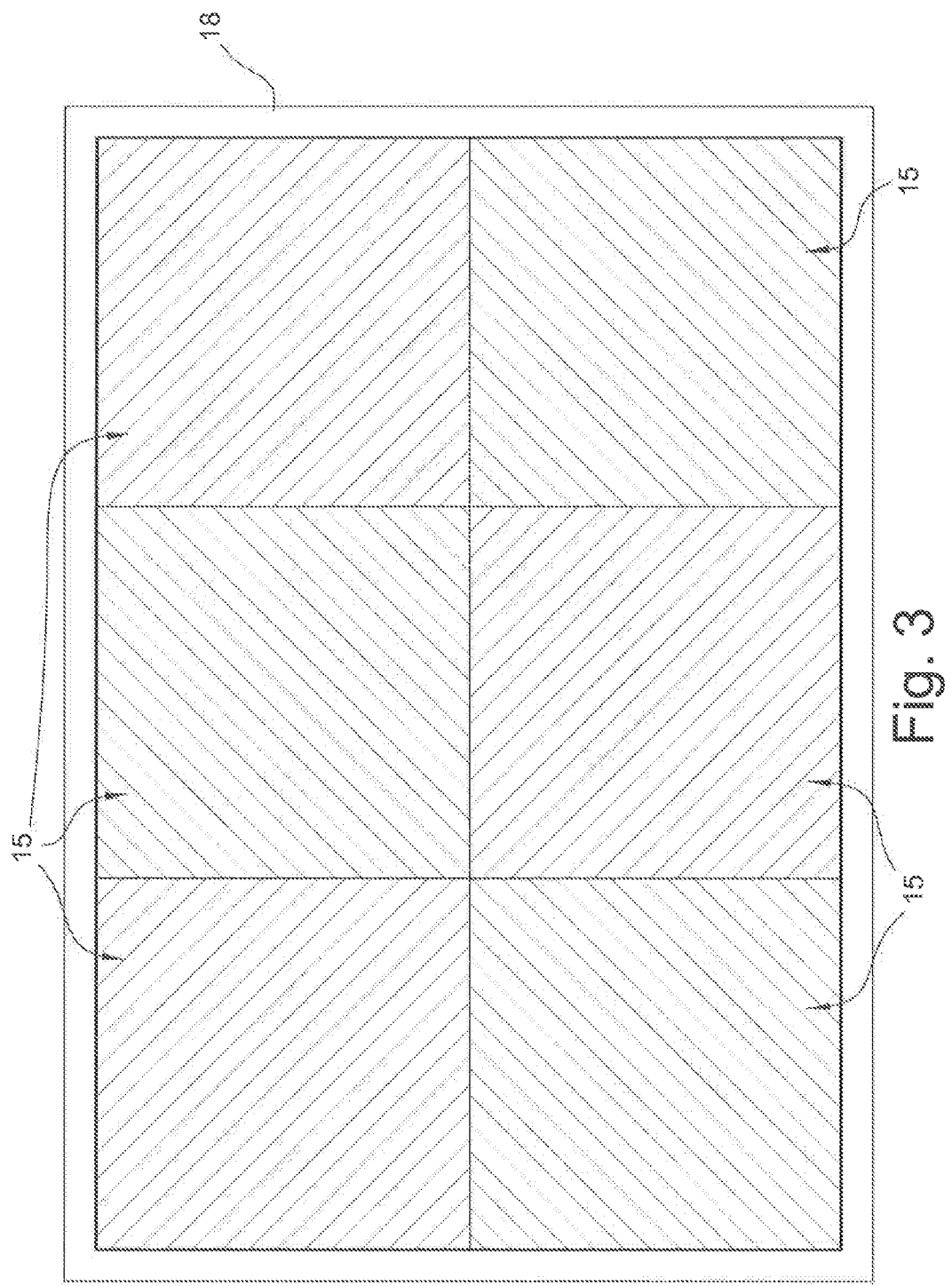
FIG. 3 is a top view of the table of FIG. 1 in which the frame of FIG. 2 is entirely covered with the elements.

In the case in which the lower frame 13 is entirely covered with the tiles 15, as shown for example in FIG. 3, the table 10 can be used as a common table the appearance of which can be modified as desired just by replacing the tiles 15.

The steel coating 17, that also partially covers the lateral edges of the tiles of ceramic material 16, on one hand acts as a protective element for the tiles 16 preventing them from breaking or chipping their corners when being removed, and on another hand it provides the table 10 with a further function.

Indeed, by inverting the tiles 16, resting on the frame 13 their ceramic face, a steel worktop is created that is easy to clean.

If there is the need of using the table as a support for chafing dishes 12, or for any other accessory, it is sufficient to remove some tiles 15 freeing up the housings 14 of the lower frame 13 and rest the chafing dishes 12 on top of them.

Figure 4:
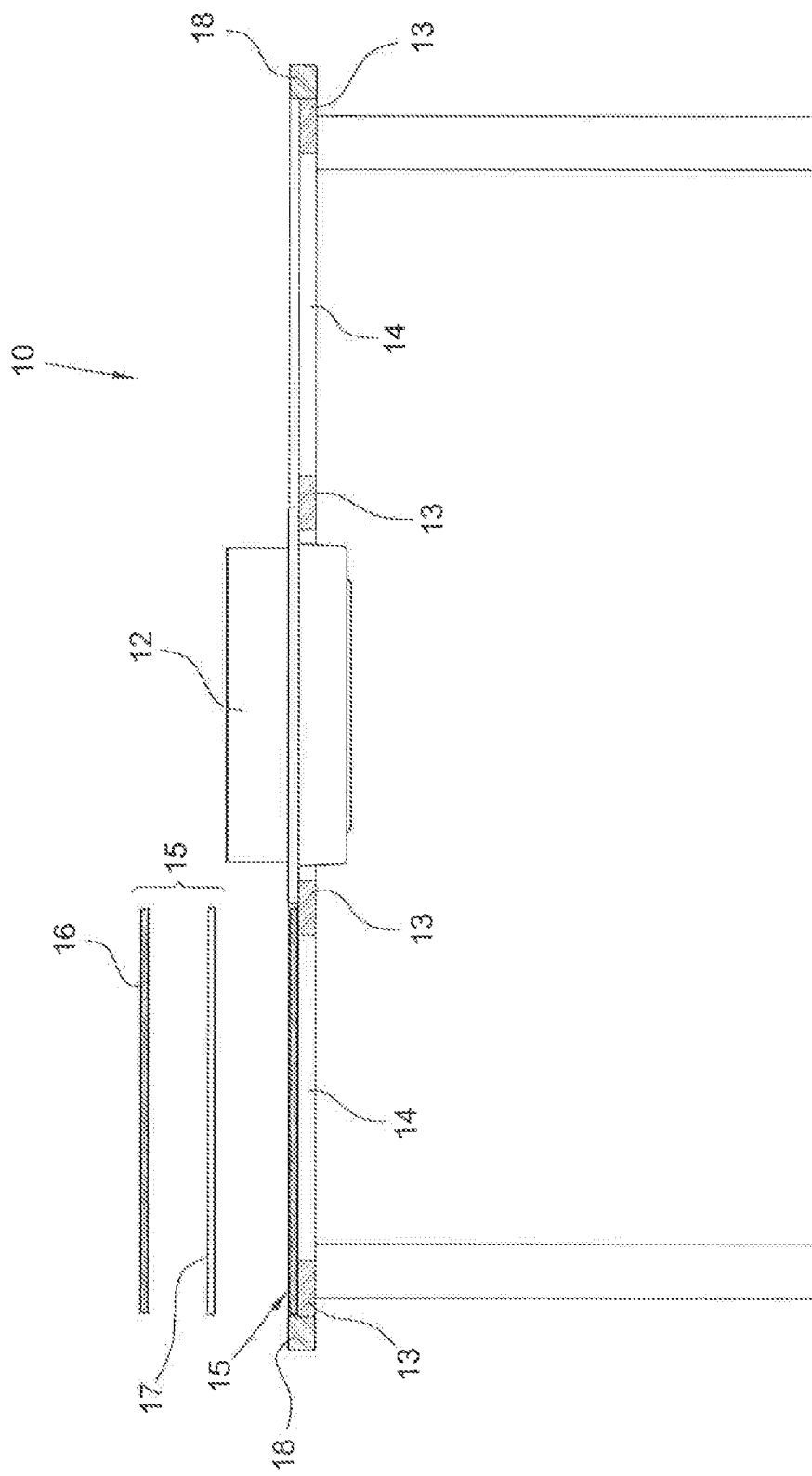
FIG. 4 is a partially exploded schematic elevation view of the table of FIG. 1 incorporating also a chafing dish.
Figure 5:
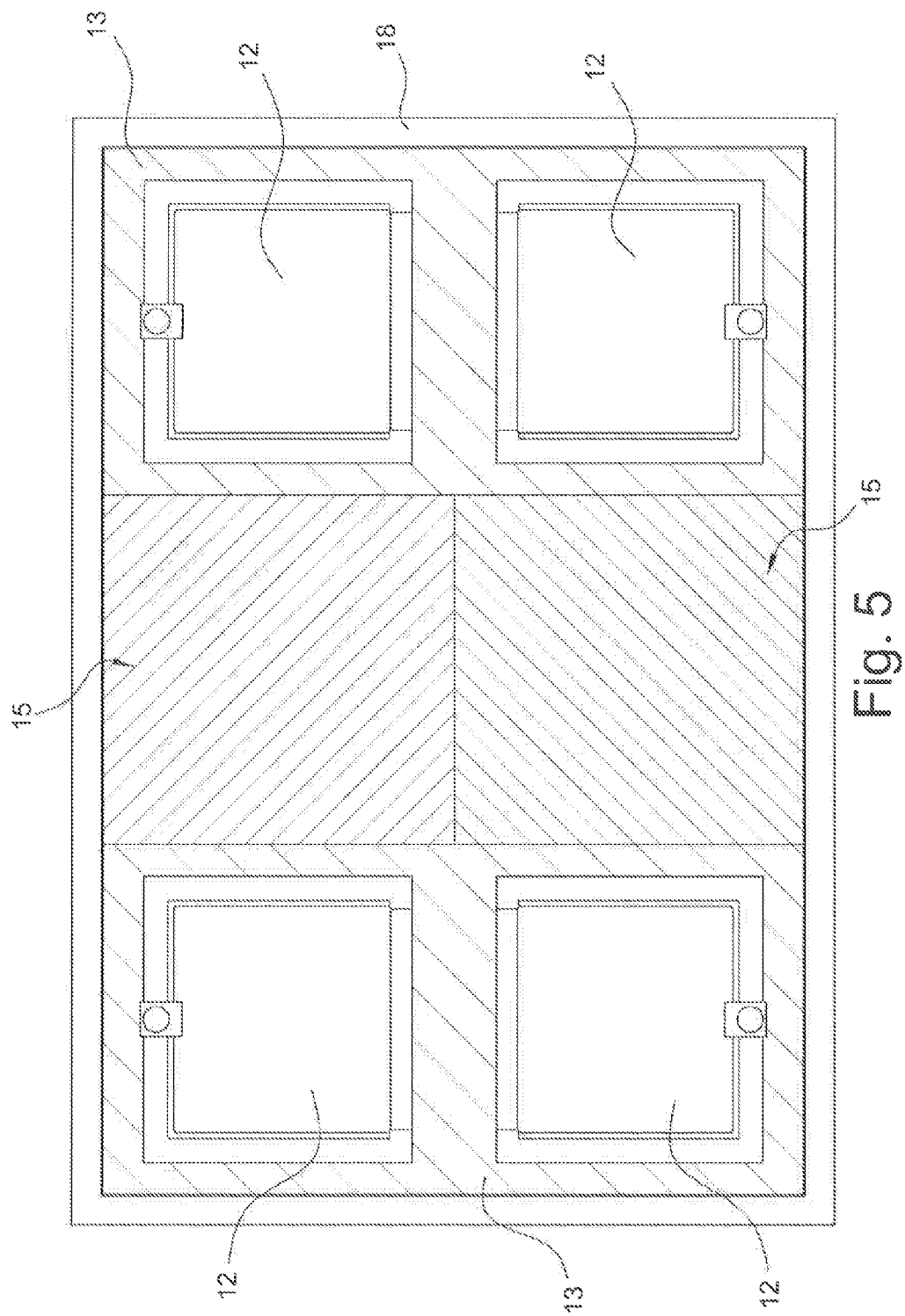
FIG. 5 is a top view of a table of the type in FIG. 4 in which some the elements have been removed so as to make space for some chafing dishes.

In such a condition the tiles 15 can be supported on the lower frame 13 with their steel face 17, as shown for example in FIGS. 4 and 5, or with their ceramic face 16.

In this last case, it is extremely easy to clean the worktop since possible food residue is deposited on a steel surface.

In order to bring the table 10 to the "resting" condition it is sufficient to remove the chafing dishes 12 and rearrange the tiles 15 as shown in FIG. 3.

Furthermore, according to another embodiment, tile elements 15' are provided so that are completely similar to those described previously but also equipped with an opening 14' for receiving chafing dishes 12.

Figure 7:
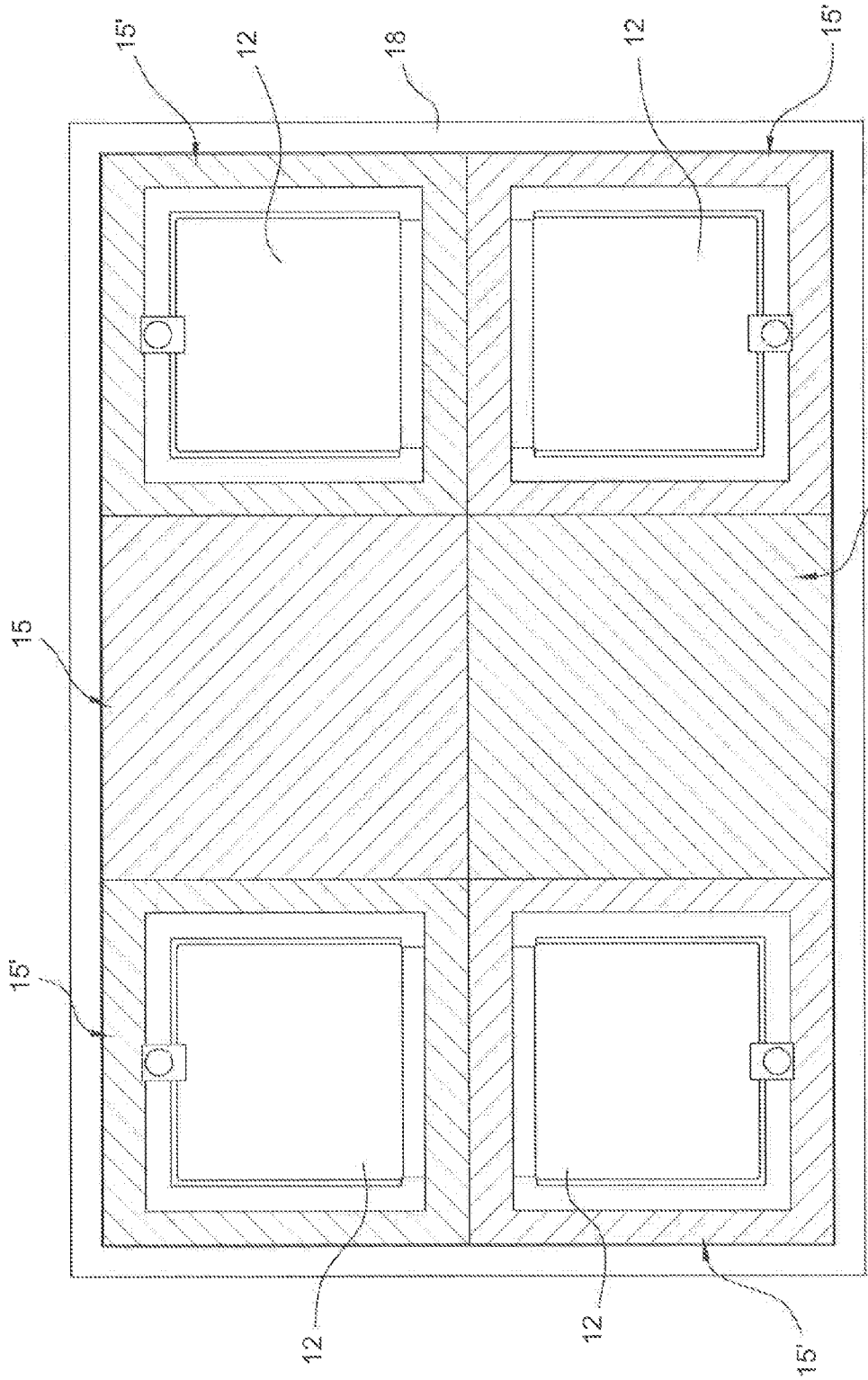
FIG. 7 is a top view of a table of the type of FIG. 6 in which some the elements are provided with openings for supporting some chafing dishes.

In such a case, as shown in FIGS. 6 and 7, the table 10 has all the functions described with the sole difference that the chafing dishes 12 do not rest directly on the frame 13 but on the tile 15' being further integrated in the overall structure.

Figure 15:
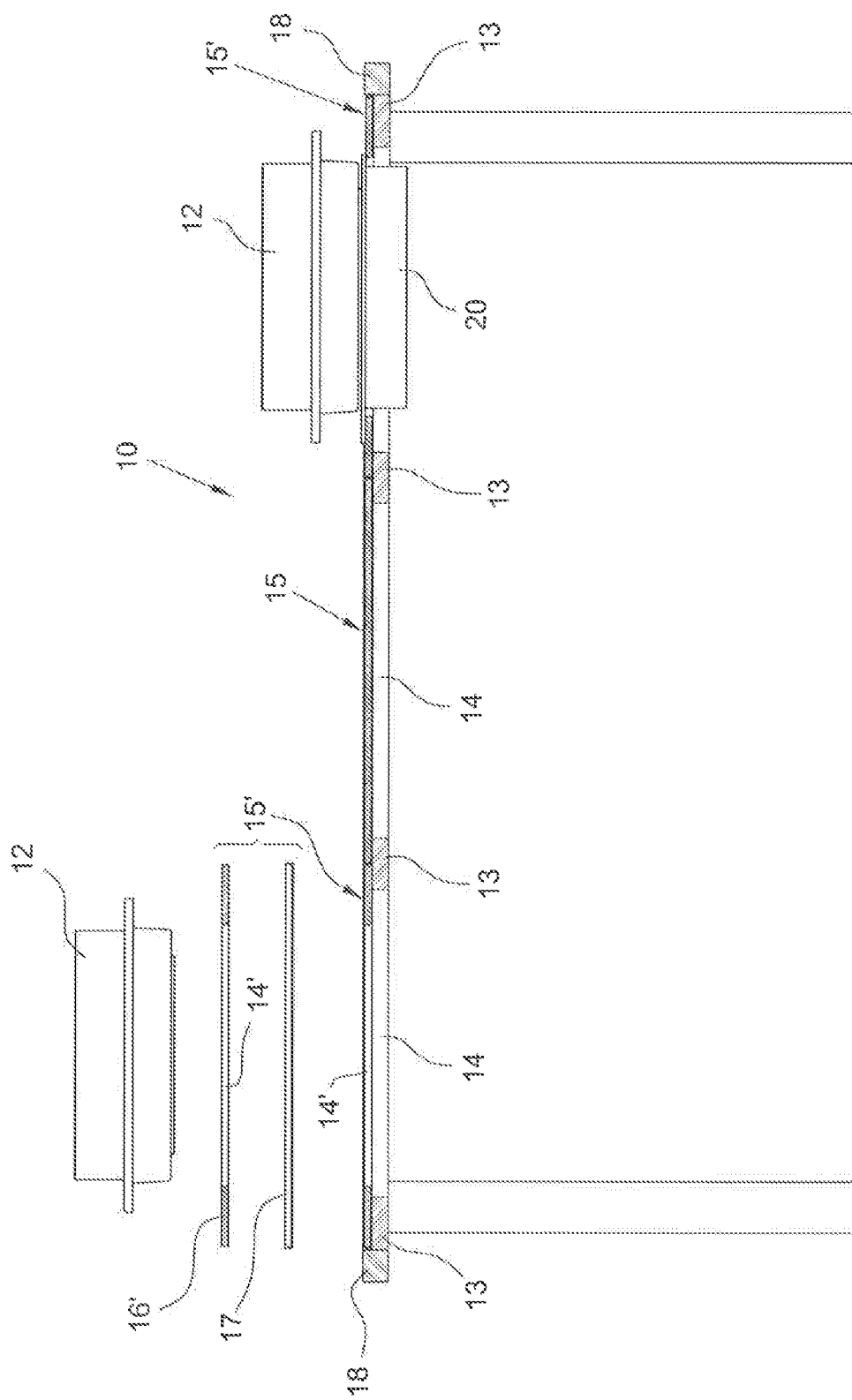

According to the embodiment shown in FIGS. 15-16, in which the tile 15", which can be associated with the table object of the present invention, also incorporates a chafing dish 12, the use and the removal of the chafing dish 12 from the table 10 object of the present invention is made even easier. Indeed, in such a case with a single operation it is possible to simultaneously remove the tile 15" and the chafing dish 12 integrated in it.

It has thus been seen that a multiuse table, in particular for supporting removable accessories, and the tile element that can be associated with such a table in a removable manner achieves the purposes previously highlighted considerably increasing the utility of tables known today.

Indeed, the multiuse table described in the present application can be used for many purposes thanks to the particular the elements, such as supporting removable accessories, being at the same time easy to clean and suitable for being adapted as desired in terms of its appearance.

Thanks to the presence of the mobile rods, the housings for receiving the accessories and the tiles can be modified as desired so as to use a single table for a plurality of displaying requirements.

The multiuse table, in particular for supporting removable accessories, and the tile element of the present invention that can be removably associated to such a table thus conceived can undergo numerous modifications and variants, all covered by the same innovative concept; moreover, all the details can be replaced by technically equivalent elements. In practice, the materials used, as well as their dimensions, can be of any type according to the technical requirements.

The invention claimed is:

1. A worktop adapted to be mounted in first openings in tables and in fixed structures, said worktop having a variable configuration for supporting and inserting removable accessories and a plurality of tile elements in mutual lateral contact in a plurality of second openings; said worktop comprising a perimetrical frame shaped in complementarity with respect to the first openings of a respective table or fixed structure, said perimetrical frame comprising portions protruding towards an inside of the respective table which are provided with means for variably positioning rods into the perimetrical frame, rods which define said plurality of second openings.

2. The worktop according to claim 1 wherein said means for variably positioning said rods comprise a plurality of holes obtained on the portions of said perimetrical frame.

3. The worktop according to claim 2 wherein said rods are also provided with protruding portions bearing a second plurality of holes for variably positioning other rods.

4. A multiuse table comprising the worktop according to claim 1, said multiuse table defining a respective first opening for receiving said perimetrical frame of said worktop.

5. The multiuse table according to claim 4 further comprising external angular elements for removably connecting to angular covering elements or extension elements of said worktop.

6. The multiuse table according to claim 5 further comprising at least one heating plate current supplied by means of electric cables foldaway housed in said table.

7. The multiuse table according to claim 6 further comprising a supply current primary cable connected on one side to an external current source and on another side to a plug element or to a multiple adaptor-socket from which a plurality of secondary cables derives for current supplying a plurality of heating plates.

8. The multiuse table according to claim 7 wherein said tile elements comprise a tile of ceramic material covered on one face by a layer of steel coating, said coating also at least partially covering the lateral edges of said tile of ceramic material.

9. The multiuse table according to claim 8 wherein said tile elements comprise a third opening for receiving said accessories by support.

* * * * *